(12) United States Patent
Li et al.

(10) Patent No.: US 10,057,574 B2
(45) Date of Patent: Aug. 21, 2018

(54) CODING TREE UNIT (CTU) LEVEL ADAPTIVE LOOP FILTER (ALF)

(71) Applicant: QUALCOMM Incorporated, San Diego, CA (US)

(72) Inventors: Xiang Li, San Diego, CA (US); Hongbin Liu, San Diego, CA (US); Ying Chen, San Diego, CA (US); Xin Zhao, San Diego, CA (US); Li Zhang, San Diego, CA (US); Jianle Chen, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 178 days.

(21) Appl. No.: 15/040,913

(22) Filed: Feb. 10, 2016

(65) Prior Publication Data
US 2016/0234492 A1    Aug. 11, 2016

Related U.S. Application Data

(60) Provisional application No. 62/115,067, filed on Feb. 11, 2015.

(51) Int. Cl.
| | |
|---|---|
| *H04N 19/117* | (2014.01) |
| *H04N 19/70* | (2014.01) |
| *H04N 19/61* | (2014.01) |
| *H04N 19/593* | (2014.01) |
| *H04N 19/176* | (2014.01) |

(Continued)

(52) U.S. Cl.
CPC ......... *H04N 19/117* (2014.11); *H04N 19/176* (2014.11); *H04N 19/50* (2014.11); *H04N 19/503* (2014.11); *H04N 19/593* (2014.11); *H04N 19/61* (2014.11); *H04N 19/70* (2014.11); *H04N 19/82* (2014.11); *H04N 19/86* (2014.11)

(58) Field of Classification Search
CPC .... H04N 19/176; H04N 19/50; H04N 19/503; H04N 19/593; H04N 19/70; H04N 19/86; H04N 19/117; H04N 19/61; H04N 19/82
USPC ..................................... 375/240.02
See application file for complete search history.

(56) References Cited

U.S. PATENT DOCUMENTS 8,982,960 B2    3/2015    Chong et al.

FOREIGN PATENT DOCUMENTS

CA    2879440 A1    1/2014

OTHER PUBLICATIONS

Notification of Transmittal of International Preliminary Report on Patentability (IPRP) for International Application No. PCT/US2016/017544, dated May 23, 2017, 29 pages.

(Continued)

*Primary Examiner* — Nguyen Truong
(74) *Attorney, Agent, or Firm* — Shumaker & Sieffert, P.A.

(57) ABSTRACT

Examples include a device for coding video data, the device including a memory configured to store video data, and one or more processors configured to obtain adaptive loop filtering (ALF) information for a current coding tree unit (CTU) from one or more of: (i) one or more spatial neighbor CTUs of the current CTU or (ii) one or more temporal neighbor CTUs of the current CTU, to form a candidate list based at least partially on the obtained ALF information for the current CTU, and to perform a filtering operation on the current CTU using ALF information associated with a candidate from the candidate list. Coding video data (Continued)

includes encoding video data, decoding video data, or both encoding and decoding video data.

47 Claims, 7 Drawing Sheets

(51) Int. Cl.
*H04N 19/50* (2014.01)
*H04N 19/503* (2014.01)
*H04N 19/82* (2014.01)
*H04N 19/86* (2014.01)

(56) References Cited

OTHER PUBLICATIONS

Fu, et al., "Sample Adaptive Offset with LCU-based Syntax," MPEG Meeting; Jul. 14-22, 2011; Torino, IT; (Motion Picture Expert Group or ISO/IEC JTC1/SC29/WG11), No. m20468, Jul. 14, 2011, 6 pp.
International Search Report and Written Opinion from International Application No. PCT/US2016/017544, dated May 12, 2016, 15 pp.
Kesireddy, et al., "Adaptive Trilateral Filter for In-Loop Filtering," Computer Science & Information Technology (CS & IT), Jul. 12, 2014, pp. 35-41, DOI: 10.5121/csit.2014.4705 ISBN: 978-1-921987-20-5, 7 pp.
Sugimoto, et al., "An Improvement on Pixel Classification for ALF based on Edge Direction," MPEG Meeting; Jul. 14-22, 2011, Torino, IT; (Motion Picture Expert Group or ISO/IEC JTC1/WG11), No. m20598, Jul. 12, 2011, 4 pp.
Tsai, et al., "Adaptive Loop Filtering for Video Coding," IEEE Journal of Selected Topics in Signal Processing, vol. 7 (6), Dec. 2013, pp. 934-945, US ISSN: 1932-4553, DOI: 10.1109/JSTSP.2013.2271974.
Wiegand et al., "WD1: Working Draft 1 of High-Efficiency Video Coding," JCTVC-C403, 3rd Meeting: Guangzhou, CN, Oct. 7-15, 2010, (Joint Collaborative Team on Video Coding of ISO/IEC JTC1/SC29/WG11 and ITU-T SG.16); Jan. 6, 2011, 137 pp.
Wiegand et al., "WD2: Working Draft 2 of High-Efficiency Video Coding," JCTVC-D503, 4th Meeting: Daegu, KR, Jan. 20-28, 2011, (Joint Collaborative Team on Video Coding of ISO/IEC JTC1/SC29/WG11 and ITU-T SG.16); Apr. 15, 2011, 153 pp.
Wiegand et al., "WD3: Working Draft 3 of High-Efficiency Video Coding," Document JCTVC-E603, 5th Meeting: Geneva, CH, Mar. 16-23, 2011,(Joint Collaborative Team on Video Coding of ISO/IEC JTC1/SC29/WG11 and ITU-T SG.16); May 9, 2015, 193 pp.
Bross et al., "WD4: Working Draft 4 of High-Efficiency Video Coding," 6th Meeting: Torino, IT, Jul. 14-22, 2011, (Joint Collaborative Team on Video Coding of ISO/IEC JTC1/SC29/WG11 and ITU-T SG.16);JCTVC-F803_d2, Oct. 4, 2011, 226 pp.
Bross et al., "WD5: Working Draft 5 of High-Efficiency Video Coding," 7th Meeting: Geneva, Switzerland, Nov. 21-30, 2011, (Joint Collaborative Team on Video Coding of ISO/IEC JTC1/SC29/WG11 and ITU-T SG.16);JCTVC-G1103_d2, Dec. 30, 2011, 214 pp.
Bross et al., "High efficiency video coding (HEVC) text specification draft 6," 8th Meeting: San Jose, CA, USA, Feb. 1-10, 2012, (Joint Collaborative Team on Video Coding of ISO/IEC JTC1/SC29/WG11 and ITU-T SG.16); JCTVC-H1003, Apr. 2, 2012, 259 pp.
Bross et al., "High efficiency video coding (HEVC) text specification draft 7," 9th Meeting: Geneva, CH, Apr. 27-May 7, 2012, (Joint Collaborative Team on Video Coding of ISO/IEC JTC1/SC29/WG11 and ITU-T SG.16); JCTVC-I1003_d2, Jun. 1, 2012, 290 pp.
Bross et al., "High efficiency video coding (HEVC) text specification draft 8," 10th Meeting: Stockholm, SE, Jul. 11-20, 2012, (Joint Collaborative Team on Video Coding of ISO/IEC JTC1/SC29/WG11 and ITU-T SG.16); JCTVC-J1003_d7, Jul. 28, 2012, 261 pp.
Bross et al., "High efficiency video coding (HEVC) text specification draft 9," 11th Meeting: Shanghai, CN, Oct. 10-19, 2012, (Joint Collaborative Team on Video Coding of ISO/IEC JTC1/SC29/WG11 and ITU-T SG.16); JCTVC-K1003_v7, Nov. 2, 2012, 290 pp.
Bross et al., "High efficiency video coding (HEVC) text specification draft 10 (for FDIS & Last Call)," 12th Meeting: Geneva, CH, Jan. 14-23, 2013, (Joint Collaborative Team on Video Coding of ISO/IEC JTC1/SC29/WG11 and ITU-T SG.16); JCTVC-L1003_v34, Mar. 19, 2013, 310 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
Response to Written Opinion dated May 12, 2016, from International Application No. PCT/US2016/017544, filed on Nov. 11, 2016, 32 pp.
Second Written Opinion from International Application No. PCT/US2016/017544, dated Jan. 31, 2017, 7 pp.
Yamakage, et al., "CE8.a1:2-D mergeable syntax," Joint collaborative Team on Video Coding (JCT-VC) of ITU-T SG16 WP3 and ISO/IEC JTC1/SC29/WG11, Nov. 2011, No. JCTVC-G316, Nov. 22, 2011, 5 pp.
Yamakage, et al., "CE8.a1:2-D mergeable syntax," Joint collaborative Team on Video Coding (JCT-VC) of ITU-T SG16 WP3 and ISO/IEC JTC1/SC29/WG11, Nov. 2011, No. JCTVC-G316r1, Nov. 22, 2011, 5 pp.

CODING TREE UNIT (CTU) LEVEL ADAPTIVE LOOP FILTER (ALF)

This Application claims the benefit of U.S. Provisional Patent Application 62/115,067 filed 11 Feb. 2015, the entire content of which is incorporated herein.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the recently finalized High Efficiency Video Coding (HEVC) standard, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

Aspects of this disclosure are related to Coding Tree Unit (CTU) level adaptive loop filtering (ALF). Techniques described herein may be applied to any of various existing video codecs, such as codecs that comply with a High Efficiency Video Coding (HEVC) standard, or any future video codecs.

Various examples include a method for coding video data that includes obtaining adaptive loop filtering (ALF) information for a current coding tree unit (CTU) from one or more of: (i) one or more spatial neighbor CTUs of the current CTU or (ii) one or more temporal neighbor CTUs of the current CTU, forming a candidate list based at least partially on the obtained ALF information for the current CTU, and performing a filtering operation on the current CTU using ALF information associated with a candidate from the candidate list.

Various examples include a device for coding video data that includes a memory configured to store video data; and one or more processors configured to obtain adaptive loop filtering (ALF) information for a current coding tree unit (CTU) from one or more of: (i) one or more spatial neighbor CTUs of the current CTU or (ii) one or more temporal neighbor CTUs of the current CTU; form a candidate list based at least partially on the obtained ALF information for the current CTU; and perform a filtering operation on the current CTU using ALF information associated with a candidate from the candidate list.

Various examples include a device for coding video data that includes means for obtaining adaptive loop filtering (ALF) information for a current coding tree unit (CTU) from one or more of: (i) one or more spatial neighbor CTUs of the current CTU or (ii) one or more temporal neighbor CTUs of the current CTU, means for forming a candidate list based at least partially on the obtained ALF information for the current CTU, and means for performing a filtering operation on the current CTU using ALF information associated with a candidate from the candidate list.

Various examples include a non-transitory computer readable storage medium having stored thereon instructions that, when executed, cause one or more processors to obtain adaptive loop filtering (ALF) information for a current coding tree unit (CTU) from one or more of: (i) one or more spatial neighbor CTUs of the current CTU or (ii) one or more temporal neighbor CTUs of the current CTU, to form a candidate list based at least partially on the obtained ALF information for the current CTU, and to perform a filtering operation on the current CTU using ALF information associated with a candidate from the candidate list.

The details of one or more examples are set forth in the accompanying drawings and the description below. Other features, objects, and advantages will be apparent from the description and drawings, and from the claims.

BRIEF DESCRIPTION OF DRAWINGS

FIGS. 3A-3C are conceptual diagrams illustrating example filter shapes.

DETAILED DESCRIPTION

Figure 1:
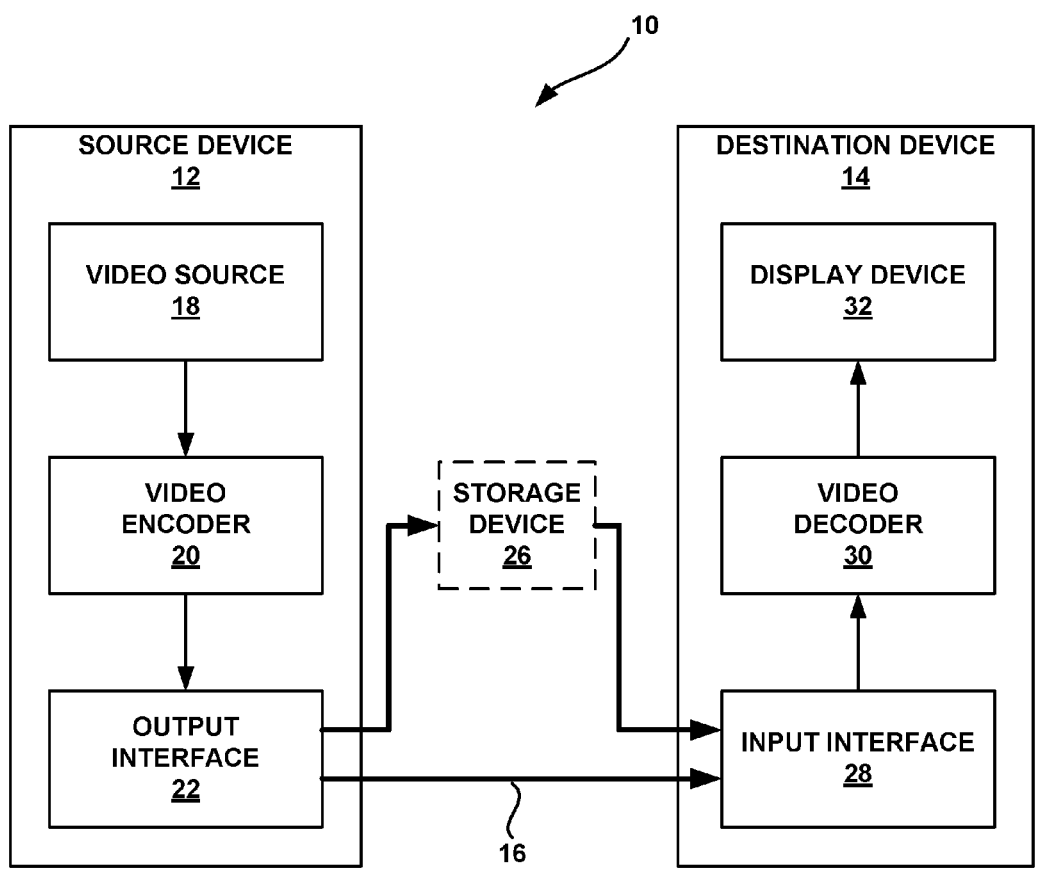
FIG. 1 is a block diagram illustrating an example video encoding and decoding system that may utilize the techniques described in this disclosure.

Video coding typically involves predicting a block of video data from either an already coded block of video data in the same picture (i.e. intra prediction) or an already coded block of video data in a different picture (i.e. inter prediction). In some instances, the video encoder also calculates residual data by comparing the predictive block to the original block. Thus, the residual data represents a difference between the predictive block and the original block. The video encoder transforms and quantizes the residual data and signals the transformed and quantized residual data in the encoded bitstream. A video decoder adds the residual data to the predictive block to produce a reconstructed video block that matches the original video block more closely than the predictive block alone. To further improve the quality of decoded video, a video decoder can perform one or more filtering operations on the reconstructed video blocks. Examples of these filtering operations include deblocking filtering, sample adaptive offset (SAO) filtering, and adaptive loop filtering (ALF). Parameters for these filtering operations may either be determined by a video encoder and explicitly signaled in the encoded video bitstream or may be implicitly determined by a video decoder.

This disclosure describes techniques associated with filtering reconstructed video data in a video encoding and/or video decoding processes and, more particularly, this disclosure describes techniques related to ALF. In accordance with this disclosure, filtering is applied at an encoder, and filter information is encoded in the bitstream to enable a decoder to identify the filtering that was applied at the encoder. The video encoder may test several different filtering scenarios, and based on a rate-distortion analysis, choose a filter or set of filters that produces a desired tradeoff between reconstructed video quality and compression quality. The video decoder receives encoded video data that includes the filter information, decodes the video data, and applies filtering based on the filtering information. In this way, the video decoder applies the same filtering that was applied at the video encoder.

Some proposals for ALF include a picture-based ALF approach, where a group of filters are signaled in an adaptation parameter set (APS) or picture parameter set (PPS) associated with a picture or frame. Which filter from the set of filters is applied to which pixels can be determined using either a block adaptive (BA) classification or a region adaptive (RA) classification. In one example of a BA classification, an activity metric (e.g. Laplacian activity) can be determined for a block of pixels. Based on the range in which the determined activity metric falls, a filter can be selected for the block. A range of activity metric values can have an associated filter. Therefore, a filter for a block can be selected based on the range with which the activity metric for the block falls. In some examples of a BA classification, more than one metric may be used. For example, a measure of Laplacian activity may be used as a first metric and a direction-based metric may be used as a second metric, and a filter may be selected based on the range of the two metrics. Aspects of applying a filter using a BA classification will be discussed in more detail below.

In an example of RA classification, a picture or frame can be divided into a fixed number of regions (e.g. 16 regions), and each region can have an associated filter. Each CU in the region can have an associated on/off flag indicating if the CU is to be filtered using the filter associated with the region or if the CU is not to be filtered. Whether a picture or frame is to be filtered using BA classifications or RA classifications can be signaled, for example, in an APS or SPS. Using an RA classification generally reduces video coder complexity relative to using a BA classification because the RA classification eliminates the need for the video decoder to calculate activity metrics for blocks. Aspects of applying a filter using an RA classification will be discussed in more detail below.

As will be explained in greater detail below, this disclosure describes techniques for applying ALF at a coding tree unit (CTU) level. The various techniques described in this disclosure relate to how ALF information is signaled in an encoded bitstream, how ALF filters are selected for a pixel or group of pixels, and how ALF filters are applied to a pixel or group of pixels. Some of the techniques of this disclosure may be explained with reference to specific examples of video encoding or video decoding. It should be understood, however, that unless explicitly stated to the contrary, the techniques may also be applicable to the other of video encoding or video decoding. As one example, a video encoder typically performs video decoding operations as part of determining how to encode video data. Therefore, video decoding techniques may be performed by a video encoder. Moreover, many coding operations rely on a video decoder performing the same operations, or in some cases reciprocal operations, performed by the video encoder. Therefore, as part of decoding video data, the video decoder may perform the same operations used to encode the video data.

FIG. 1 is a block diagram illustrating an example video encoding and decoding system 10 that may utilize the techniques described in this disclosure. As shown in FIG. 1, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Alternatively, encoded data may be output from output interface 22 to a storage device 26. Similarly, encoded data may be accessed from storage device 26 by input interface. Storage device 26 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 26 may correspond to a file server or another intermediate storage device that may hold the encoded video generated by source device 12. Destination device 14 may access stored video data from storage device 26 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 26 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 26 for later access by destination device 14 or other devices, for decoding and/or playback.

Destination device 14 includes an input interface 28, a video decoder 30, and a display device 32. In some cases, input interface 28 may include a receiver and/or a modem. Input interface 28 of destination device 14 receives the encoded video data over link 16. The encoded video data communicated over link 16, or provided on storage device 26, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to a video compression standard, such as the recently finalized High Efficiency Video Coding (HEVC) standard, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video compression standards include MPEG-2 and ITU-T H.263.

Techniques of this disclosure may utilize HEVC terminology for ease of explanation. It should not be assumed, however, that the techniques of this disclosure are limited to HEVC, and in fact, it is explicitly contemplated that the techniques of this disclosure may be implemented in successor standards to HEVC and its extensions.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

As introduced above, the JCT-VC has recently finalized development of the HEVC standard. The HEVC standardization efforts were based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-five intra-prediction encoding modes.

In HEVC and other video coding specifications, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may comprise a coding tree block of luma samples, two corresponding coding tree blocks of chroma samples, and syntax structures used to code the samples of the coding tree blocks. In monochrome pictures or pictures having three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in a raster scan order.

To generate a coded CTU, video encoder 20 may recursively perform quad-tree partitioning on the coding tree blocks of a CTU to divide the coding tree blocks into coding blocks, hence the name "coding tree units." A coding block may be an N×N block of samples. A CU may comprise a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may comprise a single coding block and syntax structures used to code the samples of the coding block.

Video encoder 20 may partition a coding block of a CU into one or more prediction blocks. A prediction block is a rectangular (i.e., square or non-square) block of samples on which the same prediction is applied. A prediction unit (PU) of a CU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block. Video encoder 20 may generate predictive luma, Cb, and Cr blocks for luma, Cb, and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU. If video encoder 20 uses inter prediction to generate the predictive blocks of a PU, video encoder 20 may generate the predictive blocks of the PU based on decoded samples of one or more pictures other than the picture associated with the PU.

After video encoder 20 generates predictive luma, Cb, and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb, and Cr residual blocks of a CU into one or more luma, Cb, and Cr transform blocks. A transform block is a rectangular (e.g., square or non-square) block of samples on which the same transform is applied. A transform unit (TU) of a CU may comprise a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients.

Video encoder 20 may output a bitstream that includes a sequence of bits that forms a representation of coded pictures and associated data. The bitstream may comprise a sequence of NAL units. A NAL unit is a syntax structure containing an indication of the type of data in the NAL unit and bytes containing that data in the form of a RBSP interspersed as necessary with emulation prevention bits. Each of the NAL units includes a NAL unit header and encapsulates a RBSP. The NAL unit header may include a syntax element that indicates a NAL unit type code. The NAL unit type code specified by the NAL unit header of a NAL unit indicates the type of the NAL unit. A RB SP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a PPS, a second type of NAL unit may encapsulate an RBSP for a coded slice, a third type of NAL unit may encapsulate an RBSP for SEI messages, and so on. NAL units that encapsulate RBSPs for video coding data (as opposed to RBSPs for parameter sets and SEI messages) may be referred to as VCL NAL units.

Video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. In addition, video decoder 30 may inverse quantize coefficient blocks associated with TUs of a current CU. Video decoder 30 may perform inverse transforms on the coefficient blocks to reconstruct transform blocks associated with the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

ALF was proposed in HEVC, and was included in various working drafts and test model software, i.e., the HEVC Test Model (or "HM"), although ALF is not included in the final version of HEVC. Among the related technologies, the ALF design in HEVC test model version HM-3.0 was claimed as the most efficient design. (See T. Wiegand, B. Bross, W. J. Han, J. R. Ohm and G. J. Sullivan, "WD3: Working Draft 3 of High-Efficiency Video Coding," Joint Collaborative Team on Video Coding (JCT-VC) of ITU-T SG16 WP3 and ISO/IEC JTC1/SC29/WG11, JCTVC-E603, 5th Meeting: Geneva, C H, 16-23 Mar. 2011, hereinafter "Working Draft 3", the entire contents of which are incorporated herein by reference) Therefore, the ALF design from HM-3.0 is introduced herein.

The ALF in HM-3.0 is based on picture level optimization. That is, the ALF coefficients are derived after a whole frame is coded. There were two modes for the luma component, block based adaptation (BA) and region based adaptation (RA). These two modes share the same filter shapes, filtering operations as well as syntax elements. The only difference between them is the classification method.

The classification in BA is at block level. Each 4×4 luma block in a picture is assigned a group index based on one-dimensional (1D) Laplacian direction (up to 3 directions) and two-dimensional (2D) Laplacian activity (up to 5 activity values). The calculation of direction $Dir_b$ and unquantized activity $Act_b$ are shown in equations (1)-(4) below, where $\hat{I}_{i,j}$ indicates a reconstructed pixel with relative coordinate (i,j) to the top-left pixel position of a 4×4 block, $V_{i,j}$ and $H_{i,j}$ are the absolute values of vertical and horizontal gradient of the pixel located at (i,j). As such, direction $Dir_b$ is generated by comparing the absolute values of the vertical gradient and the horizontal gradient in the 4×4 block and $Act_b$ is the sum of the gradients in both directions in the 4×4 block. $Act_b$ is further quantized to the range of 0 to 4, inclusive, as described in Working Draft 3.

$$V_{i,j} = |\hat{I}_{i,j} \times 2 - \hat{I}_{i,j-1} - \hat{I}_{i,j+1}| \quad (1)$$

$$H_{i,j} = |\hat{I}_{i,j} \times 2 - \hat{I}_{i-1,j} - \hat{I}_{i+1,j}| \quad (2)$$

$$Dir_b = \begin{cases} 1, & \text{if } \left(\sum_{i=0}^{3}\sum_{j=0}^{3} H_{i,j} > 2 \times \sum_{i=0}^{3}\sum_{j=0}^{3} V_{i,j}\right) \\ 2, & \text{if } \left(\sum_{i=0}^{3}\sum_{j=0}^{3} V_{i,j} > 2 \times \sum_{i=0}^{3}\sum_{j=0}^{3} H_{i,j}\right) \\ 0, & \text{otherwise} \end{cases} \quad (3)$$

$$Act_b = \sum_{i=0}^{3}\sum_{j=0}^{3}\left(\sum_{m=i-1}^{i+1}\sum_{n=j-1}^{j+1}(V_{m,n} + H_{m,n})\right) \quad (4)$$

Therefore, in total 15 (5×3) groups are categorized in a picture, and each group is associated with a group index value.

Figure 2:
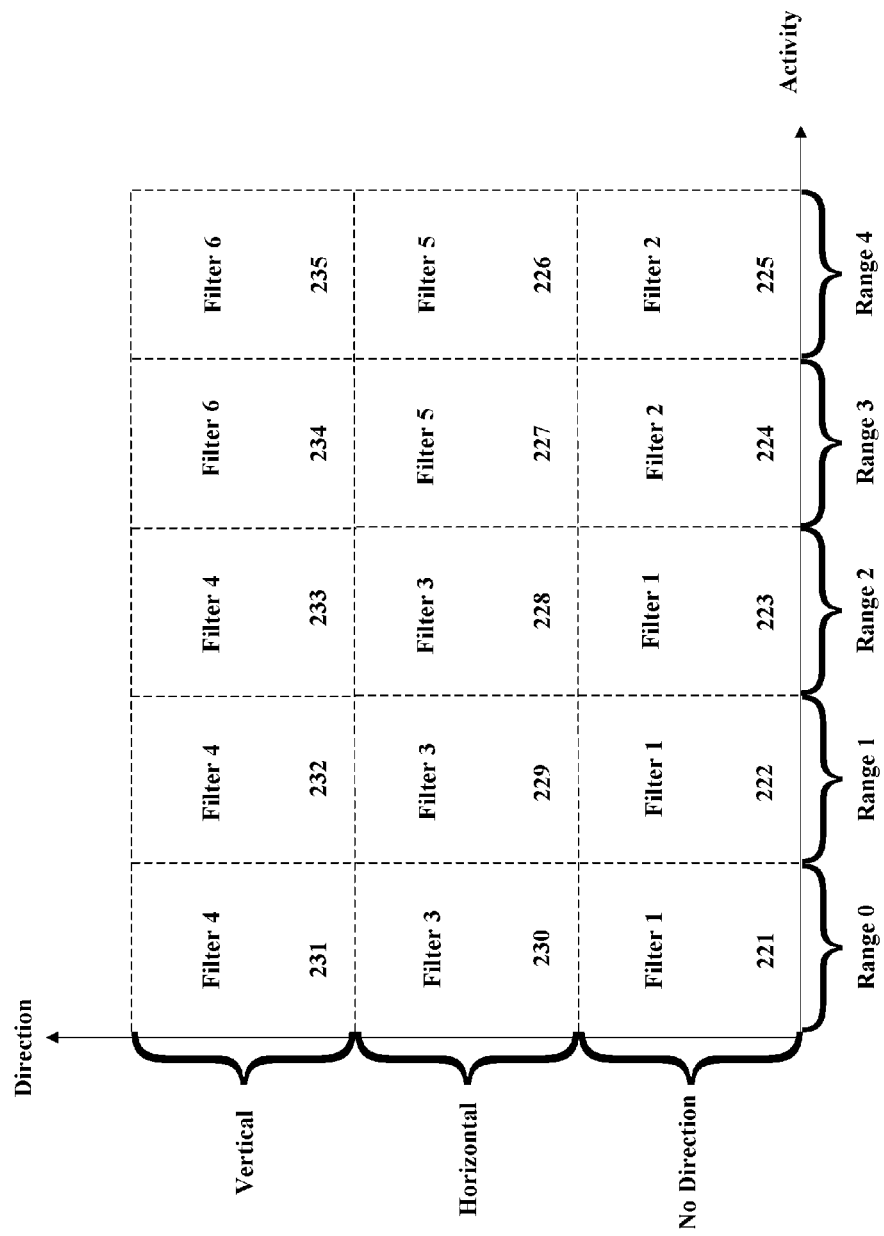
FIG. 2 is a conceptual diagram illustrating a mapping of ranges for an activity metric and a direction metric to filters.

FIG. 2 is a conceptual diagram illustrating these 15 groups used for BA classification. In the example of FIG. 2, filters are mapped to ranges of values for an activity metric (i.e., Range 0 to Range 4) and a direction metric. The direction metric in FIG. 2 is shown as having values of No Direction, Horizontal, and Vertical, which may correspond to the values of 0, 1, and 2 above from equation 3. The particular example of FIG. 2 shows six different filters (i.e. Filter 1, Filter 2 . . . Filter 6) as being mapped to the 15 categories, but more or fewer filters may similarly be used. Although FIG. 2 shows an example, with 15 groups, identified as groups 221 through 235, more or fewer groups may also be used. For example, instead of five ranges for the activity metric more or fewer ranges may be used resulting in more groups. Additionally, instead of only three directions, additional directions (e.g. a 45-degree direction and 135-degree direction) may also be used.

As will be explained in greater detail below, the filters associated with each group may be signaled using one or more merge flags. For one-dimensional group merging, a single flag may be sent to indicate if a group is mapped to the same filter as a previous group. For two-dimensional merging, a first flag may be sent to indicate if a group is mapped to the same filter as a first neighboring block (e.g. one of a horizontal or vertical neighbor), and if that flag is false, a second flag may be sent to indicate if the group is mapped to a second neighboring block (e.g. the other of the horizontal neighbor or the vertical neighbor).

For RA classification, each picture may first evenly split into 16 (4×4) CTU aligned regions, each of which is tile of the picture with quarter (¼) width and quarter (¼) height of the width and height of the picture. Pixels within a region may be regarded as in the same group.

To conserve signaling costs and associated bandwidth consumption, any two groups with adjacent index values may be merged, i.e. such that the two groups use the same set of ALF parameters. The groups may be iteratively merged based on rate-distortion cost until only one group is left. Regardless whether a corresponding mode is BA or RA, the groups are re-arranged to a 1D vector (3×5 2D activity and direction arrays being re-arranged to a 1D vector in BA or 4×4 tiles being re-arranged to a 1D vector). A right element of the 1D vector may simply reuse the ALF parameters of those in a left element. The grouping information for 1D merging in HM-3 of Working Draft 3 is signaled according to the italicized portions of Table 1 below.

TABLE 1

| | C | Descriptor |
|---|---|---|
| alf_param( ) { | | |
|   adaptive_loop_filter_flag | 2 | u(1) |
|   if ( adaptive_loop_filter_flag ) { | | |
|     alf_region_adaptation_flag | 2 | u(1) |
|     alf_length_luma_minus_5_div2 | 2 | ue(v) |
|     *alf_no_filters_minus1* | 2 | ue(v) |
|     *if (alf_no_filters_minus1 == 1)* | | |
|       *alf_start_second_filter* | 2 | ue(v) |
|     *else if (alf_no_filters_minus1 > 1) {* | | |
|       *for (i=1; i< 16; i++)* | | |
|         *alf_filter_pattern[i]* | 2 | u(1) |
|     } | | |
|     if (AlfNumFilters > 1) | | |
|       alf_pred_method | 2 | u(1) |
|     alf_min_kstart_minus1 | 2 | ue(v) |
|     for (i=0; i < AlfMaxDepth; i++) | | |
|       alf_golomb_index_bit[i] | 2 | u(1) |
|     for (i=0; i< AlfNumFilters; i++) | | |
|       for (j=0; j< AlfCodedLengthLuma; j++) | | |
|         alf_coeff_luma[i][j] | | ge(v) |
|     alf_chroma_idc | 2 | ue(v) |
|     if ( alf_chroma_idc ) { | | |
|       alf_length_chroma_minus_5_div2 | 2 | ue(v) |
|       for( i = 0; i< AlfCodedLengthChroma; i++ ) | | |
|         alf_coeff_chroma[i] | | se(v) |
|     } | | |
|   } | | |
| } | | |

The related semantics (for the syntax of Table 1 above) are as follows.

alf_no_filters_minus1 plus 1 specifies the number of filter sets for the current slice.

alf_start_second_filter specifies the variance index of luma samples where the second filter is applied, when alf_no_filters_minus1 is equal to 1.

alf_filter_pattern[i] specifies the filter index array corresponding to i-th variance index of luma samples, when alf_no_filters_minus1 is greater than 1. The number of filter sets AlfNumFilters is derived as follows:

If alf_no_filters_minus1 is less than 2, $$\text{AlfNumFilters} = \text{alf\_no\_filters\_minus1} + 1 \quad (7\text{-}15)$$

Otherwise (alf_no_filters_minus1 is greater than 2)

$$\text{AlfNumFilters} = \Sigma_i \text{ alf\_filter\_pattern}[i] \text{ with } i=0 \ldots 15 \quad (7\text{-}16)$$

Regardless of whether a corresponding mode is BA or RA, the groups are still in a 2D array. Any one or more elements of the 2D array may be assigned into one merged group thus with only one set of ALF coefficients signalled. It is also noted that 2D merging based method has been proposed in T. Yamakage, T. Watanabe, T. Chujoh, C.-Y. Chen, C.-M. Fu, C.-Y. Tsai, Y.-W. Huang, S. Lei, I. S. Chong, M. Karczewicz, T. Ikai, "CE8.a.1: 2-D mergeable syntax", Joint Collaborative Team on Video Coding (JCT-VC) of ITU-T SG16 WP3 and ISO/IEC JTC1/SC29/WG11, JCTVC-G316, Geneva, November, 2011 (hereinafter, JCTVC-G316), the entire contents of which are incorporated herein by reference. As shown in the italicized portions of Table 2 below, the proposed method requires significant signaling overhead to support flexible 2D merging.

TABLE 2

| | C | Descriptor |
|---|---|---|
| Alf_param( ) { | | |
|   adaptive_loop_filter_flag | 2 | ae(v) |
|   if ( adaptive_loop_filter_flag ) { | | |
|     alf_region_adaptation_flag | 2 | ae(v) |
|     alf_filter_shape_flag | 2 | ae(v) |
|     alf_no_filters_minus1 | 2 | ae(v) |
|     *for (i=1; i < AlfNumRegions; i++) {* | | |
|       *if (alf_no_filters_minus1 == 1) {* | | |
|         *alf_region_idx[ i ]* | | ae(v) |
|       *} else if (alf_no_filters_minus1 > 1) {* | | |
|         *if( remain_fixed_regions > 0) {* | | |
|           *prev_alf_region_pred_flag[ i ]* | | ae(v) |
|           *if( prev_alf_region_pred_flag[ i ] )* | | |
|             *rem_alf_region_pred_idx[ i ]* | | ae(v) |
|         } | | |
|       } | | |
|     } | | |
|     if (AlfNumFilters > 1) | | |
|       alf_pred_method | 2 | ae(v) |
|     alf_min_kstart_minus1 | 2 | ae(v) |
|     for (i=0; i < AlfMaxDepth; i++) | | |
|       alf_golomb_index_bit[i] | 2 | ae(v) |
|   ... | | |

The semantics below correspond to the italicized portions of Table 2. alf_region_idx[i] specifies the filter index for adaptive loop filter. prev_alf_region_pred_flag [i] and rem_alf_region_pred_idx [i] specify the coefficients index CoeffIdx for adaptive loop filter. When prev_alf_region_pred_flag [i] is equal to 0, the alf_region_idx[i] will be inferred from an index of the neighboring classes.

An array CoeffIdx is derived as follows.

CoeffIdx[0] is set to be 0.

a value alf_curr_filters is set to be 1.

For each i in the range of 1 to AlfNumRegions −1, the following steps are processed, If alf_no_filters_minus1 is 0, CoeffIdx[i] is set to be 0.

Otherwise if alf_no_filters_minus1 is 1, CoeffIdx[i] is set to be alf_region_idx[i]

Otherwise if alf_no_filters_minus 1 is larger than 1, CoeffIdx[i] is derived as the following steps a value of alf_remain_regions is derived as AlfNumRegions−i a value of alf_remain_filters is derived as AlfNumFilters−alf_curr_filters a value of remain_fixed_region is derived as alf_remain_regions−alf_remain_filters if remain_fixed_region is 0, CoeffIdx[i] is inferred to be a value of alf_curr_filters Otherwise if prev_alf_region_pred_flag[i] is 1, CoeffIdx[i] is inferred to a predicted value mpm_region_idx[i].

Otherwise if rem_alf_region_pred_idx[i] is less than mpm_region_idx[i], CoeffIdx[i] is set to be prev_alf_region_pred_flag[i].

Otherwise CoeffIdx[i] is set to be rem_alf_region_pred_idx[i].

If CoeffIdx[i] is equal to alf_curr_filters, alf_curr_filters is incremented by 1.

mpm_region_idx[i] is derived as follows,

If alf_remain_regions is larger than alf_remain_filters>>1, mpm_region_idx[i] is derived as alf_curr_filters.

Otherwise if (i % 5) is 0 and alf_region_adaptation_flag is 0, mpm_region_idx[i] is derived as CoeffIdx[i−5]

Otherwise mpm_region_idx[i] is derived as CoeffIdx[i−1]

Figures 3A, 3B, 3C:
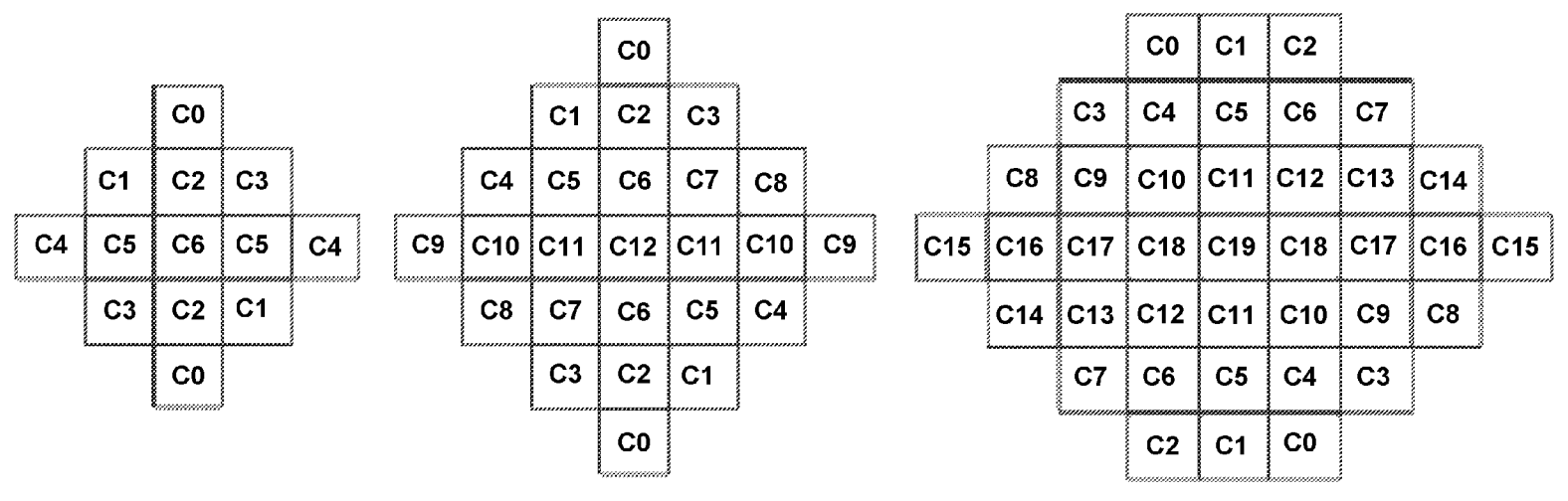

For each group (after possible merging), a set of ALF coefficients are signaled. Up to three circular symmetric filter shapes (as shown in FIGS. 3A-3C) are supported. More specifically, FIGS. 3A-3C illustrate three ALF filter shapes, namely, a 5×5 diamond (e.g. FIG. 3A), a 7×7 diamond (e.g. FIG. 3B), and a truncated 9×9 diamond (e.g. FIG. 3C). In addition, a flag is signaled at CU level to indicate whether ALF is applied to the current CU (as per the ALF design of Working Draft 3).

Filter coefficients (sometimes called filter taps) may be defined or selected in order to promote desirable levels of video block filtering that can reduce blockiness and/or improve the video quality in other ways. A set of filter coefficients, for example, may define how filtering is applied along edges of video blocks or other locations within video blocks. Different filter coefficients may cause different levels of filtering with respect to different pixels of the video blocks. Filtering, for example, may smooth or sharpen differences in intensity of adjacent pixel values in order to help eliminate unwanted artifacts.

In this disclosure, the term "filter" generally refers to a set of filter coefficients. For example, a 3×3 filter may be defined by a set of 9 filter coefficients, a 5×5 filter may be defined by a set of 25 filter coefficients, a 9×5 filter may be defined by a set of 45 filter coefficients, and so on. The term "set of filters" generally refers to a group of more than one filter. For example, a set of two 3×3 filters, could include a first set of 9 filter coefficients and a second set of 9 filter coefficients. The term "shape," sometimes called the "filter support," generally refers to the number of rows of filter coefficients and number of columns of filter coefficients for a particular filter. For example, 9×9 is an example of a first shape, 7×5 is an example of a second shape, and 5×9 is an example of a third shape. In some instances, filters may take non-rectangular shapes including diamond-shapes, diamond-like shapes, circular shapes, circular-like shapes, hexagonal shapes, octagonal shapes, cross shapes, X-shapes, T-shapes, other geometric shapes, or numerous other shapes or configuration. The examples in FIGS. 3A-3C are diamond shapes, however other shapes may be used. In most common cases, regardless of the shape of the filter, the center pixel in the filter mask is the pixel that is being filtered. In other examples, the filtered pixel may be offset from the center of the filter mask.

For both of the chroma components in a picture, one single set of ALF coefficients is applied with no classification. The filter shape of 5×5 diamond is always used. At the decoder side, each pixel sample $\hat{I}_{i,j}$ is filtered to $I'_{i,j}$ based on the calculations as shown in equation (5) below, where L denotes filter length, $f_{m,n}$ represents filter coefficient, and o indicates filter offset or DC coefficient.

$$I'_{i,j}=\Sigma_{m=-L}^{L}\Sigma_{n=-L}^{L}f_{m,n}\times\hat{I}_{i+m,j+n}+o \qquad (5)$$

After HM-3.0 was released, ALF was further improved in terms of lower complexity and better signaling. Furthermore, to reduce coding latency introduced by the picture level ALF in HM-3, CTU level syntax was also proposed. More information may be found in C.-Y. Tsai, C.-Y. Chen, T. Yamakage; I. S. Chong, Y.-W. Huang, C.-M. Fu, T. Itoh, T. Watanabe, T. Chujoh, M. Karczewicz, S.-M. Lei, "Adaptive Loop Filtering for Video Coding", IEEE Journal of Selected Topics in Signal Processing, Vol. 7, no. 6, December 2013, the entire contents of which are incorporated herein by reference.

In the proposed CTU level ALF, the ALF parameters may be signaled explicitly or inherited from spatially neighboring CTUs. When signalled explicitly, up to T (where T is set to a particular value, e.g., 15) ALF filters are signalled for the current CTU. When inherited, an indicator is sent to indicate whether the ALF filters are inherited from a neighboring (e.g., left or above) CTU. When the ALF filters of the current CTU are indicated to be inherited from a neighboring (e.g., a left or above CTU), all ALF filters of the neighboring CTU are copied to be those of the current CTU and no more ALF filter is signalled. In HM-6, flexible syntaxes were employed to better support spatial inheritance of ALF parameters, e.g., run length coding is used to support "copy from left". Further details of these aspects of HM-6 may be found in B. Bross, W.-J. Han, G. J. Sullivan, J.-R. Ohm, T. Wiegand, "High Efficiency Video Coding (HEVC) text specification draft 6", Joint Collaborative Team on Video Coding (JCT-VC) of ITU-T SG16 WP3 and ISO/IEC JTC1/SC29/WG11, JCTVC-H1003, San Jose, Calif., February, 2012 (hereinafter, "Working Draft 6"), the entire contents of which are incorporated herein by reference.

The techniques described above relating to ALF may improve the coding efficiency significantly. However, the techniques like those described above may still present one or more potential issues or limitations. For example, regardless of whether a BA-based or RA-based classification is used, the ALF methods in HM-3.0 may require picture level optimizations to derive the ALF parameters for the multiple groups. This leads to potentially undesirable encoding latency within a picture, because the ALF coefficients are derived until a whole frame has been coded. Moreover, a whole picture needs to be loaded several times to derive ALF coefficients, which increases memory bandwidth requirement considerably, especially for hardware implementations.

The techniques described herein may extend ALF to the CTU level instead of picture level to avoid the potential problem described in bullet (1) above, as in Working Draft 6. However, some techniques, which optimize and signal ALF parameters at CTU level, may be much less efficient than ALF signaling and optimization at the picture level.

In various examples, aspects of the ALF techniques are applied at the CTU level (e.g., by ALF unit 65 of video encoder 20,) and signaled as a part of CTU data with one of more of the proposed methods. In various examples, ALF unit 65 may copy ALF information of a CTU from the CTU's spatially and/or temporally neighboring CTUs in a similar way to the merge mode of motion vector coding in HEVC. In this case, a candidate list of ALF parameters from the neighboring CTUs is constructed (e.g., by ALF unit 65) and an index to the candidate list is signalled to determine the ALF parameters. Each entry of the aforementioned candaidate list is a full set of ALF parameters that are used to perform the adaptive loop filtering (e.g., by ALF unit 65) for the current CTU.

The nubmer of entries in the candidate list is not limited to a particualr nubmer of entries. In some examples the maximal number of entries in the candidate list of ALF parameters may be pre-defined to be a fixed value, or signaled in bitstream, or variant dependent (e.g., a variable that depends) on other signaled information, e.g. set the same as the number of motion merge candidates. Such information may be present in a picture parater set (PPS), a slice header, a sequence parameter set (SPS), or other levels or places containing high-level syntax.

In an example, up to five candidates may be used. However, in various examples, a different nubmer of candidates may be used, including less than or more than five candidates. In an example, two spatial candidates (left CTU and top CTU) and three temporal candidates are employed.

The source of candidate for candidate lists is not limited to a particular souce. In various examples, the sourse of candidates for the candidate list may include spatial and/or temporally neighboring CTUs. In various examples, different rules apply to what souces may be used to provide candidates, and how many candates on the candadtle list can be used (maximum nujber) or must be used (minimum nubjer) for a given candate list.

In some examples, only spatial candidates are allowed for Intra slices. In some examples, one or more temporal candidates are collocated CTUs in one or more reference pictures. In some examples, the temporal candidates are restricted to be in the reference pictures with the same slice types and/or a similar (e.g., same) QP range. In some exampled, CTUs other than the collocated CTU in a reference picture may also be used, such as the bottom-right, top-left, top, left CTUs adjacent to the co-located CTU in a reference picture.

In various examples, when constructing the merge list, temporal candidates are inserted based on the order of the reference indexes with which the temporal candidates are associated.

In an example, assuming that the CTU size is 2N×2N, the current CTU is equally divided as M×M sub-blocks, where 2N is a multiplication (or multiple) of M. For each M×M sub-block, one or more temporal candidates, which are located by a motion vector of this sub-block may be used for deriving the ALF information. In various examples, when locating a temporal candidate with a MV, the CTU which covers the top-left corner of the block pointing by the MV may be used as a temporal candidate. Alternatively, the CTU which covers the center point of the block pointing by the MV may be used as a temproal candidate. In various examples, when bi-prediction is used for a sub-block, only MV0 is used to locate a temporal candidate. In some examples, only MV1 is used to locate the temproal candidate. Alternatively, which MV(s) are used to locate temporal candidates is signaled in a bitstream such as in an SPS, a PPS or a slice header. In an example, M is set to 8. In another examples, M is set to 4. In another example, M is set to 1.

The maximal number of entries in the candidate list of ALF parameters may be pre-defined to be a fixed value, or signaled in bitstream, or variant dependent (e.g., a variable that depends) on other signaled information, e.g. set the same as the number of motion merge candidates. Such information may be present in a picture parater set (PPS), a slice header, a sequence parameter set (SPS), or other levels or places containing high-level syntax.

In some examples, only two candiates from spatial/temporal neighors may be enventually present in the list. In some examples, the temporal candidates may be allowed only if at least one of the blocks in the current CTU is coded with Inter prediction mode. In some examples, tempral candidates may not be allowed for a CTU of an Intra coded slice. In some examples, temporal candidates may be allowed for a CTU of an Intra coded slice. In some examples, the temporal candidates may be allowed only if temporal motion vector prediction is enabled. In some examples, the temporal candidate(s) is only allowed from a fixed or dedicated reference picture, which may be signaled in a slice header. Alternatively (or in addition), such a picture may be further contrained to be the picture used for temporal motion vector prediction.

In various examples, an indication of whether or not temporal candidates are allowed is signalled as high-level syntax e.g., PPS, slice header, SPS or other levels/places containing high-level syntax.

Similar as in motion vector prediction, entries containing the same content (e.g., ALF prameters) from different neighbors do not need to be duplicated in the list. Therefore, in some examples there is a pruning process to get rid of duplications. Spatial or temporal candidates may be added into the list (with or without pruning) in a pre-defined order. Alternatively (or in addition), such an order may depend on whether one or more bocks in the current CTU is/are temporal predicted in a certain fashion. For example, if temporal motion prediction applies to some blocks, the temporal candidates may be put into earlier positions of the list. As the ALF is done after decoding of the whole CTU, the percentage of the area with temporal motion prediction may be used to decide the relative order/position of the temporal candidates in the list.

In some examples, when temporal candidates are allowed, only one temporal candidate may be chosen from reference pictures based on the reference indices of the coded blocks within the CTU. For example, the most frequently used picture may be chosen. Alterantively (or in addition), if only the co-located temporal CTU is allowed, motion vectors pointing to pixels outside a region co-located to that of the current CTU are not taken into consideration for the frequency calculation.

In various examples, CTU ALF information may be predicted from spatially and/or temporally neighboring CTUs. In this case, only differential information is signaled in addition to an index to identify a predictor. In some examples, the spatially and/or temporally neighboring CTUs are defined in the any of the same ways as described above.

In variouse examples, since Sample Adaptive Offest (SAO) parameters may be regarded as part of the ALF parameters (e.g., a special case of CTU ALF with only DC coefficients) SAO information may also be combined together with ALF parameters. Additionally, the above methods for ALF signaling and prediction may apply jointly for ALF and SAO prameters. Alternatively, SAO and ALF parameters may be signaled independently, but sharing the same merge mechanism. In this case, the above methods, as described with respect to ALF parameters, may apply as improved methods for signaling of SAO parameters.

In various examples, filter symmetry information (such as symmetric or non-symmetric) may be signaled at CTU level. Alternatively, the filter symmetry information may be signaled for each set of filter. In addition, a flag in SPS/PPS/ slice header may be signaled to indicate whether non-symmetric filter will be used in the related parts of bitstream.

In varius examples, quantization information for filter coefficients may be signaled at CTU level or for each set of filter. In addition, data (e.g., an indicator) in SPS/PPS/slice header may be signaled to indicate whether quantization information will be signaled in the related portions/parts of bitstream. In some examples, quantization information may be the number of bits to be left shifted to generate the interger value of filter coefficient from theparsed filter coefficients. In some examples, instead of explicit signalling of filter coefficients quantization information in the bitstream (by video encoder 20), the filter coefficient quantization information is implicitly derived (e.g., by ALF unit 91 of video decoder 30) based on the ALF coefficients. In some examples, the number of quantization bits is calculated (e.g., by ALF unit 91 of video decoder 30) based on the summation of all alf weighting coefficients. In some examples, the sum of non-DC ALF coefficients is first rounded to $2^n$, e.g. sum 126 is rounded to 128 ($2^7$, here n=7). Then, the number of quanitzation bits is derived (e.g., by ALF unit 91 of video decoder 30) as the difference between 8 and n. In the previous example, n=7. Therefore, the number of quantization bits is 1.

In various examples, for a filter, information on whether the filter coefficients has only DC coefficient thus the filter contains just an offset value, is signaled (e.g., by video encoder 20). In this case, no other filter coefficient but the DC is signaled. In some examples, in cases where only the DC coefficient is present and other coefficients are not present for a filter, the DC coeffcient is signaled in the unit of pixel, or "unit pixel value." In some examples, DC and other filter coefficients are signaled in higher accuracy, e.g., $\frac{1}{256}$ of unit pixel value (in this case "one" is normalized to value 256).

In various examples, for a filter, the center filter coefficient (such as coefficient C6 in the 5×5 diamond filter shown at the far left of FIG. 2E) is signaled differently from other filter coefficients. For example, the other coefficients are explicitly signalled while the center coeficient is differential coded, meaning only the difference between the center coefficient value and a default value is coded. The default value is chosen so that it is normalized to be one (1). For example, if the coefficients are quantized so that floating value 1.0 is represented by integer 256, the coefficients are $[F_0, F_1 \ldots, F_{n-1}]/256$. In some examples, the center coefficient (e.g., which may be denoted as $F_{n-1}$) is coded follows:

At video encoder 20, $v = F_{n-1} - 256$, and v is further coded. Video decoder 30 may parse a value of v and $F_{n-1}$ is derived (e.g., by ALF unit 91) to be v+256.

Alternatively, at video encoder 20, $v = F_{n-1} - (256 - \text{sum}(F_0, F_1 \ldots, F_{n-2}))$, and v is further coded. Video decoder 30 may parse a value of v and $F_{n-1}$ is derived (e.g., by ALF unit 91) to be $(v + (256 - \text{sum}(F_0, F_1 \ldots, F_{n-2})))$.

In various examples, in cases where multiple groups are used in a CTU, two-dimensional group merging instead of one-dimensional group merging may be used. In one implementation, instead of allowing any two groups to be merged into one, only the horizontal or verical neighbored groups may be merged. As one example, referring to FIG. 2, if the groups are transmitted based on their ordinal identifier (e.g. first group 221, then group 222, etc.), then group 228 may be merged with group 227 or groups 223. Group 228 may not be merged with any of groups 229-235 because those groups have not yet been signalled. Further more, group 228 may not be merged with groups 221, 222, or 225-227 because those groups are not horizontal or vertical neighbors.

In some examples, after merging, only one set of ALF prameters is signalled for each merged group. If BA classification applies, the pixels in a CTU are categorized into several groups. The group indexes are ordered in a 2D map. For 2D group merging, a group may merge to its left or top neighbors in the 2D map, assuming the transmission order begins from a top-left position. Further details of this implementation are explained below.

In various examples, one-dimensional group merging can still be used within a CTU. However, the two dimensiontal characteristics (of activity and direction) may be converted to one dimentional group index in a different way. Initial filter/group index is designed following the princple that: two adjacent filters (i.e., two filters with adjacent indices) must have either adjacent activities or adjacent directions. A filter may only merge to its adjacent neighbor. Denote $Dir_b$ and $Act_b$ as the direction and activity of a block b respectively, and assuming that $Dir_b$ can range from 0 to (M−1), and $Act_b$ can range from 0 to (N−1), i.e., there are at most M directions and N activities. Then, the group index of the block b is calculated as: $Dir_b*N+(Dir_b \%2==1?N-1-Act_b:Act_b)$, instead of just $Dir_b*N+Act_b$. In another example, the group index of the block b is calculated as: $Act_b*M+(Act_b \%2==1?M-1-Dir_b:Dir_b)$.

In various examples, when ALF is enabled and the CTU has a large size, e.g., 256×256, the CU/PU size may be further constrained to be no larger than a second size, such as 64×64. Therefore, the splitting_flag syntax element of a node corrponding to a size larger than the second size (e.g., 64×64) must be set to a value of one (1). In case the node correponds to a size larger than the second size, the flag may be signalled to be 1 or the signaling of such a flag can be avoided and it is derived to be 1 in this case.

Various examples described herein utilise various methods for pixel/block classification. n some examples, classification may be based on reconstructed pixel values. In various examples, CTU ALF coding mode is signaled at CTU level to indicate a certain number of directions. Pixel gradient is calculated along the directions. Then, the pixels are categorized according to the gradient.

In some examples, the classification used for seleting a filter from a group of filters may be based on previously coded information, such as CU coding mode, quantization, or transform. In some sexamples, within a CTU, pixels in blocks with the same CU coding mode, or with the same CU size, or with the same transform information (e.g., size, type) are classified as the same categories, meaning the pixels are filtered using the same filter (e.g. same size, same shape, same coefficients, etc.). The various classifications may, for example, replace the classification techniques explained relative to FIG. 2 or may be used in conjunction with such classifcation techniques.

In some example, a number of CTU ALF luma modes and chroma modes may be signaled seperately in bitstream, such as in an SPS, a PPS, or a slice header. In various examples, numbers of CTU ALF luma modes and chroma modes may be the same and only one number is signaled in bitstream, such as in the SPS, the PPS, or the slice header. In this context, luma modes and chroma modes refer to modes for determining pixel classifications. A number of available modes may, for example, be signalled at a higher level (e.g. SPS, PPS, slice header, etc.), and the actual modes may be signalled at the CTU level. Examples of classification modes include, an activity-direction mode, a CU coding mode-based classification mode, a transform information-based classification mode, and other such classification modes. In some implementations, SAO may be considered a classification mode as well.

In various examples, padding is utilized. In some examples, when pixels outside CTU, or CTU row, or slice, or tile, or picture boundaries are needed for classficiation or filtering process and the pixels are not available, padding used in interpolation process may apply.

In various examples, CTU ALF may be cascaded. That is, ALF process may be applied multiple times for a CTU by, for example, performing a filtering operation on a CTU that has already been filtered. The input to the second round ALF process is the output of the first round ALF process. Different CTU ALF coefficients and control information may be signaled for different rounds of filtering. In some examples, the number of maximal rounds may be signaled in the bitstream, such as in an SPS, a PPS, or a slice header. In some examples, if CTU ALF is off for a CTU in the current round, CTU ALF is required to be off for the next round for this CTU, even if the number of rounds signaled in bitstream has not been reached.

In various examples, block level (BA) classification is selected as the CTU ALF mode for a CTU. In various examples, two-dimensional (2D) group merging is used. In an exmple, according to BA classification, pixels in the CTU are categorized into 5×3 groups. The initial group indexes may be put into a 2D map as follows (see Table 3 below), where the horinztonal and vertical directions correspond to activity and direction values, as discussed above.

TABLE 3

| 0  | 1  | 2  | 3  | 4  |
|----|----|----|----|----|
| 5  | 6  | 7  | 8  | 9  |
| 10 | 11 | 12 | 13 | 14 |

In this example, any group is allowed to merge to its left or top neighboring group. Based on rate-distortion cost or other measurement, the 15 groups may be finally merged into 4 groups as shown in Table 4 below, in which the numbers indicate the new group indexes. For example, new group #0 is merged by old group #0, #5 (merged up to old #0) and #6 (merged left to old #5).

TABLE 4

| 0  | 1  | 1 | 1 | 1 |
|----|----|---|---|---|
| 0  | 0  | 1 | 1 | 9 |
| 10 | 10 | 1 | 1 | 9 |

After group merging, a video encoder, (such as video encoder 20) may signal filter coefficients for new group #0, #1, #9, and #10. For others, video encoder 30 may signal only merge indicators, such as merge left or merge up.

In various examples, two CTU ALF modes, namely, Edge_VH and Edge_Diag are defined. When Edge_VH is used, pixels in a CTU are categorized into 5 groups. Let $\hat{I}_{i,j}$ represent a reconstructed luma/chroma sample, the classification is performed as follows:

if ($\hat{I}_{i,j} < \hat{I}_{i,j-1}$ AND $\hat{I}_{i,j} < \hat{I}_{i,j+1}$)
groupID=0
else if ($\hat{I}_{i,j} > \hat{I}_{i,j-1}$ AND $\hat{I}_{i,j} > \hat{I}_{i,j+1}$)
groupID=1
else if ($\hat{I}_{i,j} < \hat{I}_{i-1,j}$ AND $\hat{I}_{i,j} < \hat{I}_{i+1,j}$)
groupID=3
else if ($\hat{I}_{i,j} > \hat{I}_{i-1,j}$ AND $\hat{I}_{i,j} > \hat{I}_{i+1,j}$)
groupID=4
else
groupID=2

When Edge_Diag is used, pixels in a CTU are categorized into 5 groups. Let $\hat{I}_{i,j}$ represent a reconstructed luma/chroma sample, the classification is performed as follows:

if ($\hat{I}_{i,j} < \hat{I}_{i-1,j+1}$ AND $\hat{I}_{i+1,j-1}$)
groupID=0
else if ($\hat{I}_{i,j} > \hat{I}_{i-1,j+1}$ AND $\hat{I}_{i,j} > \hat{I}_{i+1,j-1}$)
groupID=1
else if ($\hat{I}_{i,j} < \hat{I}_{i-1,j-1}$ AND $\hat{I}_{i,j} < \hat{I}_{i+1,j+1}$)
groupID=3
else if ($\hat{I}_{i,j} > \hat{I}_{i-1,j-1}$ AND $\hat{I}_{i,j} > \hat{I}_{i+1,j+1}$)
groupID=4
else
groupID=2

In another example, five CTU ALF modes, namely, Edge_0, Edge_90, Edge_45, Edge_135 which are similar to horizontal, vertical, 45 degrees diagonal, 135 degrees diagonal EO classes in SAO classification are defined. SAO classifications are described in C.-M. Fu, E. Alshina, A. Alshin, Y.-W. Huang, C.-Y. Chen, C.-Y. Tsai, C.-W. Hsu, S.-M. Lei, J.-H. Park, W.-J. Han, "Sample Adaptive Offset in the HEVC Standard", IEEE Transactions on Circuits and Systems for Video Technology, Vol. 22, No. 12, December 2012 (hereinafter, "SAO in the HEVC Standard"), the entire contents of which are incorporated herein by reference.

When any of the listed modes is used, pixels in a CTU are classified into five groups. The classification for the first 4 groups is the same as those in SAO classification (Table 1 of "SAO in the HEVC Standard"). The pixels that are not in the first four groups are put in the fifth group. In the above examples, Edge_VH, Edge_Diag, and Edge_0, Edge_90, Edge_45, Edge_135 can also be used together with BA mode.

In one example, each 4×4 block is classified into one of the 25 groups. In the classification, pixel gradient along vertical, horizonal, 45 degree, and 135 degree directions are used. For a 4×4 block b, $V_{i,j}$ and $H_{i,j}$ may denote the vertical and horizontal gradients, respectively, of the pixel position (i,j) belonging to b, and $Act_b$ may denote the activity of the block b (as defined above). $D_{i,j} = |\hat{I}_{i,j} \times 2 - \hat{I}_{i-1,j+1} - \hat{I}_{i+1,j-1}|$ and $ID_{i,j} = |\hat{I}_{i,j} \times 2 - \hat{I}_{i-1,j-1} - \hat{I}_{i+1,j+1}|$ may denote (or provide the derivation for) the gradient along directions 45 degree and 135 degree of the pixel position (i,j). The average gradients of the block b may be defined as follows:

$$AvgV_{i,j} = \sum_{i=0}^{3} \sum_{j=0}^{3} V_{i,j}$$

$$AvgH_{i,j} = \sum_{i=0}^{3} \sum_{j=0}^{3} H_{i,j}$$

$$AvgD_{i,j} = \sum_{i=0}^{3} \sum_{j=0}^{3} D_{i,j}$$

$$AvgID_{i,j} = \sum_{i=0}^{3} \sum_{j=0}^{3} ID_{i,j}$$

The direction $Dir_b$ block b is defined as follows:

$$Dir_b = \begin{cases} 1, & \text{if } (AvgH_{i,j} > 2 \times AvgV_{i,j} \text{ and } AvgH_{i,j} > AvgD_{i,j} \text{ and } AvgH_{i,j} > AvgID_{i,j}) \\ 2, & \text{if } (AvgV_{i,j} > 2 \times AvgH_{i,j} \text{ and } AvgV_{i,j} > AvgD_{i,j} \text{ and } AvgV_{i,j} > AvgID_{i,j}) \\ 3, & \text{if } (AvgD_{i,j} > 2 \times AvgID_{i,j} \text{ and } AvgD_{i,j} > AvgH_{i,j} \text{ and } AvgD_{i,j} > AvgV_{i,j}) \\ 4, & \text{if } (AvgID_{i,j} > 2 \times AvgD_{i,j} \text{ and } AvgID_{i,j} > AvgH_{i,j} \text{ and } AvgID_{i,j} > AvgV_{i,j}) \\ 0, & \text{otherwise} \end{cases}$$

The group index of the block b is defined as:

$Dir_b \times 5 + (Dir_b \%2?4 - Act_b : Act_b)$

In various examples, syntax and semantics are implemented on top of the HEVC (H.265) specification. The newly proposed portions are italicized in the syntax tables below (namely, Tables 5-8 as included herein).

TABLE 5

Sequence Parameter Set (SPS) RBSP Syntax

| | Descriptor |
|---|---|
| seq_parameter_set_rbsp( ) { | |
| ... | |
|     sample_adaptive_offset_enabled_flag | u(1) |
|     *alf_ctu_enabled_flag* | *u(1)* |
|     *if (alf_ctu_enabled_flag) {* | |
|         *alf_ctu_num_luma_mode_minus1* | *ue(v)* |
|         *alf_ctu_num_chroma_mode_minus1* | *ue(v)* |
|         *alf_ctu_num_merge_cand* | *ue(v)* |
|     *}* | |
| ... | |

Wherein:

alf_ctu_enabled_flag equal to 1 specifies that the CTU level ALF process is applied to the reconstructed picture after the SAO process. alf_ctu_enabled_flag equal to 0 specifies that the CTU level ALF process is not applied to the reconstructed picture after the SAO process.

alf_ctu_num_luma_mode_minus1 specifies the number of luma mode of CTU level ALF as follows: AlfModeNumY=alf_ctu_num_luma_mode_minus1+1 alf_ctu_num_chroma_mode_minus1 specifies the number of chroma mode of CTU level ALF as follows: AlfModeNumC=alf_ctu_num_chroma_mode_minus1+1 ctu_alf_num_merge_cand plus 1 specifies the number of ALF candidates for CTU ALF merge. If ctu_alf_num_merge_cand, no candidate list is formulated to predict the ALF parameters of the current CTU. When not present, ctu_alf_num_merge_cand is inferred to be equal to 0.

TABLE 6

Coding Tree Unit (CTU) Syntax

| | Descriptor |
|---|---|
| coding_tree_unit( ) { | |
|   xCtb = ( CtbAddrInRs % PicWidthInCtbsY ) << CtbLog2SizeY | |
|   yCtb = ( CtbAddrInRs / PicWidthInCtbsY ) << CtbLog2SizeY | |
|   if( slice_sao_luma_flag \|\| slice_sao_chroma_flag ) | |
|     sao( xCtb >> CtbLog2SizeY, yCtb >> CtbLog2SizeY ) | |
|   *if( ctu_alf_enabled_flag )* | |
|     *ctu_alf( xCtb >> CtbLog2SizeY, yCtb >> CtbLog2SizeY )* | |
|   coding_quadtree( xCtb, yCtb, CtbLog2SizeY, 0 ) | |
| } | |

TABLE 7

CTU Adaptive Loop Filter (ALF) Syntax

| | Descriptor |
|---|---|
| *ctu_alf( ) {* | |
|   *if(ctu_alf_num_merge_cand > 0 ) {* | |
|     *alf_merge_flag* | *ae(v)* |
|     *if(alf_merge_flag && ctu_alf_num_merge_cand > 1 )* | |
|       *alf_merge_index* | *ae(v)* |
|   *if(! alf_merge_flag ) {* | |
|     *alf_luma_enabled_flag* | *ae(v)* |
|     *if(alf_luma_enabled_flag ) {* | |
|       *alf_luma_mode* | *ae(v)* |
|       *alf_luma_filter_shape* | *ae(v)* |
|       *alf_luma_filter_symmetry* | *ae(v)* |
|       *for( i = 0 ; i < AlfLumaMergeMap[alf_luma_mode][1] ; i++)* | |
|         *for( j = 0 ; j < AlfLumaMergeMap[alf_luma_mode][0] ; j++ ) {* | |
|           *alf_luma_filter_merge_idc* | *ae(v)* |
|           *if(alf_luma_filter_merge_idc == 0 ) {* | |
|             *alf_filter_coeff(AlfLumaFilterCoeffNum )* | |
|           *}* | |
|         *}* | |
|     *}* | |
|   *alf_chroma_enabled_flag* | *ae(v)* |
|   *if(alf_chroma_enabled_flag ) {* | |

TABLE 7-continued

CTU Adaptive Loop Filter (ALF) Syntax

|  | Descriptor |
|---|---|
| alf_chroma_mode | ae(v) |
| for( i = 0 ; i < | |
| AlfChromaMergeMap[ctu_alf_chroma_mode][1] ; i++ ) | |
|   for(j = 0 ; j < ) { | |
|     AlfChromaMergeMap[ctu_alf_chroma_mode][0] ; j++ | |
|       alf_chroma_filter_merge_idc | ae(v) |
|       if(alf_luma_filter_merge_idc == 0 ) { | |
|         alf_filter_coeff(AlfChromaFilterCoeffNum ) | |
|       } | |
|     } | |
|   } | |
| } | |
| } | |

Wherein:

alf_merge_flag equal to 1 specifies that the ALF parameters of the current CTU is merged to spatial or temporal neighboring CTU. alf_merge_flag equal to 0 specifies that the ALF parameters of the current CTU is signaled in bitstream.

alf_merge_index specifies the index of CTU ALF merge candidate. When not present, alf_merge_index is inferred to be equal to 0.

alf_luma_enabled_flag equal to 1 specifies that luma ALF is applied to the current CTU and luma ALF parameters are signaled for the current CTU. alf_luma_enabled_flag equal to 0 specifies that luma ALF is not applied to the current CTU and no luma ALF parameters are signaled for the current CTU.

alf_luma_mode specifies the classification method to be used for luma pixels in the current CTU. alf_luma_mode shall be no larger than AlfModeNumY. Additional details on classification methods may be found in 5.2 above.

alf_luma_shape specifies the luma filter shape for the current CTU.

alf_luma_filter_symmetry equal to 1 specifies that the luma filter is circular symmetric for the current CTU. alf_luma_filter_symmetry equal to 0 specifies that the luma filter is not symmetric for the current CTU.

alf_luma_filter_merge_idc specifies whether the current luma filter is merged to its left or top luma filter in AlfLumaMergeMap. AlfLumaMergeMap indicates the group merging status as described above and is dependent on alf_luma_mode. alf_luma_filter_merge_idc equal to 0 specifies the group is not merged from a top or left group. alf_luma_filter_merge_idc equal to 1 specifies the group is not merged from a left group. alf_luma_filter_merge_idc equal to 2 specifies the group is not merged from a top group.

alf_chroma_enabled_flag equal to 1 specifies that chroma ALF is applied to the current CTU and chroma ALF parameters are signaled for the current CTU. alf_chroma_enabled flag equal to 0 specifies that chroma ALF is not applied to the current CTU and no chroma ALF parameters are signaled for the current CTU.

alf_chroma_mode specifies the classification method to be used for chroma pixels in the current CTU.

alf_chroma_filter_merge_idc specifies whether the current chroma filter is merged to its left or top chroma filter in AlfChromaMergeMap. AlfChromaMergeMap is dependent on alf_chroma_mode.

TABLE 8

CTU ALF Coefficient Syntax

|  | Descriptor |
|---|---|
| alf_filter_coeff (CoeffNum) { | |
|   alf_filter_dc_only_flag | ae(v) |
|   if(alf_filter_dc_only ) | |
|     alf_filter_coeff_dc | ae(v) |
|   else { | |
|     alf_filter_quant_bit | ae(v) |
|     alf_filter_coeff_dc | ae(v) |
|     for( i = 0 ; i < CoeffNum ; i++ ) | |
|       alf_filter_coeff | ae(v) |
|   } | |
| } | |

Wherein:

alf_filter_dc_only_flag equal to 1 specifies that the current filter only has DC coefficient. All other coefficients are zero. alf_filter_dc_only_flag equal to 0 specifies that the current filter has non-zero coefficients in addition to DC coefficient.

alf_filter_coeff_dc specifies the DC coefficient of the current filter.

alf_filter_quant_bit specifies the number of bits used in filter coefficient quantization.

alf_filter_coeff specifies the non-DC coefficient of the current filter. When not present, ctu_alf_filter_coeff is inferred to be equal to 0.

Figure 4:
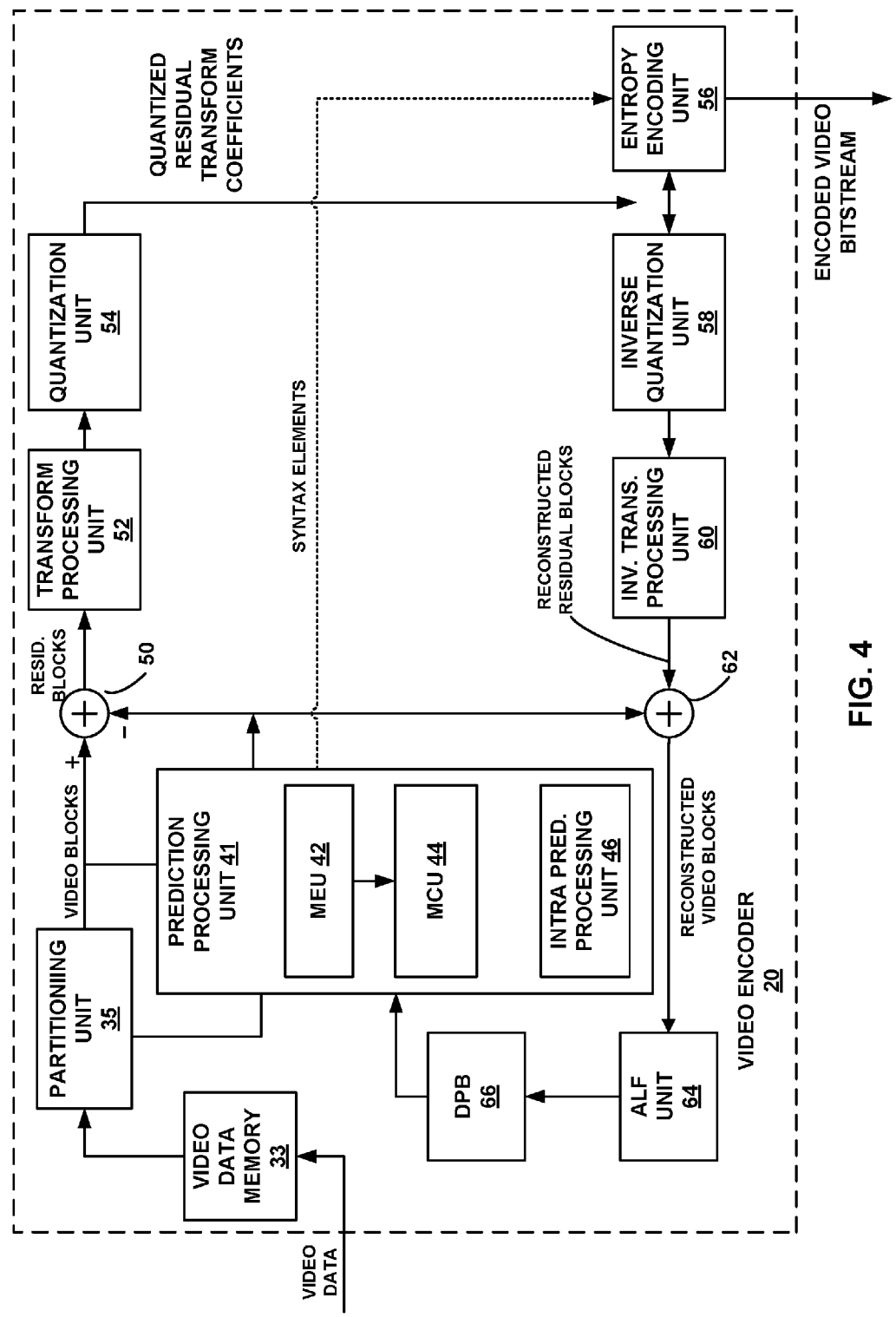
FIG. 4 is a block diagram illustrating an example video encoder that may implement the techniques described in this disclosure.

FIG. 4 is a block diagram illustrating an example video encoder 20 that may implement the techniques described in this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 4, video encoder 20 includes a video data memory 33, partitioning unit 35, prediction processing unit 41, summer 50, transform processing unit 52, quantization unit 54, entropy encoding unit 56. Prediction processing unit 41 includes motion estimation unit (MEU) 42, motion compensation unit (MCU) 44, and intra prediction unit 46. For video block reconstruction, video encoder 20 also includes inverse quantization unit 58, inverse transform processing unit 60, summer 62, ALF unit 64, and decoded picture buffer (DPB) 66.

As shown in FIG. 4, video encoder 20 receives video data and stores the received video data in video data memory 33. Video data memory 33 may store video data to be encoded by the components of video encoder 20. The video data stored in video data memory 33 may be obtained, for example, from video source 18. DPB 66 may be a reference picture memory that stores reference video data for use in encoding video data by video encoder 20, e.g., in intra- or inter-coding modes. Video data memory 33 and DPB 66 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 33 and DPB 66 may be provided by the same memory device or separate memory devices. In various examples, video data memory 33 may be on-chip with other components of video encoder 20, or off-chip relative to those components.

Partitioning unit 35 retrieves the video data from video data memory 33 and partitions the video data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra coding modes or one of a plurality of inter coding modes, for the current video block based on error results (e.g., coding rate and the level of distortion). Prediction processing unit 41 may provide the resulting intra- or inter-coded block to summer 50 to generate residual block data and to summer 62 to reconstruct the encoded block for use as a reference picture.

Intra prediction unit 46 within prediction processing unit 41 may perform intra-predictive coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices or B slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in DPB 66. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in DPB 66. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

After prediction processing unit 41 generates the predictive block for the current video block, either via intra prediction or inter prediction, video encoder 20 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within one of the reference picture lists. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed block.

ALF unit 64 filters the reconstructed block (e.g. the output of summer 62) and stores the filtered reconstructed block in DPB 66 for uses as a reference block. The reference block may be used by motion estimation unit 42 and motion compensation unit 44 as a reference block to inter-predict a block in a subsequent video frame or picture. Although not explicitly shown in FIG. 4, video encoder 20 may include additional filters such as of a deblock filter, a sample adaptive offset (SAO) filter, or other type of loop filter. A deblock filter may, for example, apply deblocking filtering to filter block boundaries to remove blockiness artifacts from reconstructed video. An SAO filter may apply offsets to reconstructed pixel values in order to improve overall coding quality. Additional loop filters (in loop or post loop) may also be used.

ALF unit 64 in conjunction with other components of video encoder 20 may be configured to perform the various techniques described in this disclosure. For example, video encoder 20 may be configured to obtain ALF information for a current CTU from one or more of: (i) one or more spatial neighbor CTUs of the current CTU or (ii) one or more temporal neighbor CTUs of the current CTU. Video encoder 20 may form a candidate list based at least partially on the obtained ALF information for the current CTU and perform a filtering operation on the current CTU using ALF information associated with a candidate from the candidate list. The ALF information may include ALF coefficients as well as a mapping of ALF filters to classification metrics.

In various examples, video encoder 20 may determine new ALF information and generate, for inclusion in an encoded bitstream of video data, a syntax element including an index associated with the candidate from the candidate list. Video encoder 20 may also generate, for inclusion in the encoded bitstream of video data, difference information identifying a difference between the new ALF information and the ALF information associated with the candidate. In other examples, video encoder 20 may generate for inclusion in an encoded bitstream of video data a syntax element indicating an index associated with the candidate from the candidate list, in which case the ALF filter information is copied from the candidate and no difference information is generated.

The one or more classification metrics may include an activity metric and a direction metric or may include other classification metrics such as one or more of a size of a CU comprising the one or more pixels, a coding mode of the CU comprising the pixels, a size of a transform unit corresponding to the one or more pixels, or a type of transform unit corresponding to the one or more pixels.

In various examples video encoder 20 may generate a filtered image by performing the filtering operation on the one or more pixels of the CTU using the selected ALF filter. As part of a decoding loop of an encoding operation, video encoder 20 may generate a filtered image by performing the filtering operation on the one or more pixels of the CTU using the selected ALF filter, and store the filtered image in a decoded picture buffer (e.g. DPB 94). The one or more spatial neighbor CTUs may be positioned adjacent to the current CTU within a picture. The one or more temporal neighbor CTUs may represent co-located CTUs in respective reference pictures.

The one or more spatial neighbor CTUs may include a left neighbor CTU and an above neighbor CTU with respect to the current CTU, and the one or more temporal neighbor CTUs may include a total of three (3) temporal neighbor CTUs in three (3) respective reference pictures. The one or more temporal neighbor CTUs may be co-located CTUs in one or more reference pictures. In various examples, the one or more temporal CTUs may be restricted to be in one or more reference pictures with a same slice type.

In various examples, the one or more temporal CTUs are restricted to be in one or more reference pictures having a same quantization parameter (QP) range.

In some examples, video encoder 20 may form the candidate list by inserting the temporal neighbor CTUs into the candidate list based on an order of the reference indexes the temporal neighboring CTUs are associated with. In some examples, video encoder 20 may form the candidate list to include one or more temporal neighboring CTUs in the respective reference pictures other than co-located temperal neghboring CTUs.

In various examples, video encoder 20 may obtain the ALF information for a current CTU that is a 2N×2N CTU, divide the CTU into M×M sub-blocks, where 2N is an integer multiple of M, determine for each M×M sub-block one or more temporal candidates which are located by a motion vector of the M×M sub-block, and derive the ALF informaton from the the one or more temporal candidates located by the motion vector. In various examples, video encoder 20 may locate a temporal candidate with the motion vector. The CTU which covers the top-left corner of the block pointed to by the motion vector may be used as a temporal candidate, or the CTU which covers the center point of the block pointed to by the motion vector may be used as a temproal candidate.

In various examples video encoder 20 may, when bi-prediction is used for a sub-block, only a motion vector 0 is used to locate temporal candidate, or only motion vector 1 is used to locate temproal candidate, or which motion vectors are used to locate temporal candidates are signaled in bitstream such as in an SPS, PPS or slice header. In various examples, M may be set to 8, 4, 1, or other values. In various examples, a maximum number of entries in the candidate list may be a fixed value, and the maximum number of entries may be indicated in an encoded video bitstream.

In various examples, a maximum number of entries in the candidate list may be a variable value, and the maximum number of entries may be derived from information included in an encoded video bitstream. In various examples, only two canditates from spatial/temporal neighors may be incuded in the candidate list. In various examples, the temporal candidates may be allowed only if at least one of the blocks in the current CTU is coded with inter prediction mode, or tempral candidates may not be allowed for a CTU of an Intra coded slice, or tempral candidates may be allowed for a CTU of an Intra coded slice.

In various examples, video encoder 20 may signal whether temporal candidates are allowed or not signaling as high-level syntax e.g., PPS, slice header, SPS or at other places containing high-level syntax. In various examples, video encoder 20 may form the candidate list by applying a a pruning process to get rid of one or more duplicate candidates.

When spatial or temporal candidates are allowed, the candidates may be added into the candidate list (with or without pruning) in a pre-defined order. Such an order may depend on whether some bocks in the current CTU are in a certain fashion temporal predicted. For example, if temporal motion prediction applies to some blocks, the temporal candidates may be put into earlier positions of the list, and ALF may performed after decoding of the whole CTU. The percentage of the area with temporal motion prediction may be used to decide the relative order and position of the temporal candidates in the candidate list.

In various examples, when temporal candidates are allowed, only one temporal candidate may be chosen from reference pictures based on the reference indices of the coded blocks within the CTU. The most frequently used picture may be chosen, or if only a co-lcoated temporal CTU is allowed, motion vectors pointing to pixels outside a region co-located to that of the current CTU may not be taken into consideration for the frequency calculation.

In various examples, video encoder 20 may form the candidate list by forming the candidate list to include the obtained ALF information for the current CTU and one or more SAO parameters associated with the current CTU. In various examples, video encoder 20 may signal the one or more SAO parameters and the ALF parameters independently but using the same merge mechanism. In various examples, video encoder 20 may encode the current CTU by encoding filter symmetry information associated with the obtained ALF information for the current CTU.

In various examples, video encoder 20 may signal filter symmetry information at the CTU level. The filter symmetry information may include symmetric and non-symmetric information, and may be signaled for each set of filters. Video encoder 20 may signal a flag in a SPS/PPS/slice header to indicate whether a non-symmetric filter will be used in the related parts of the bitstream. In various examples video encoder 20 may include encode the current CTU by encoding quantization information associated with the obtained ALF information for the current CTU.

Figure 5:
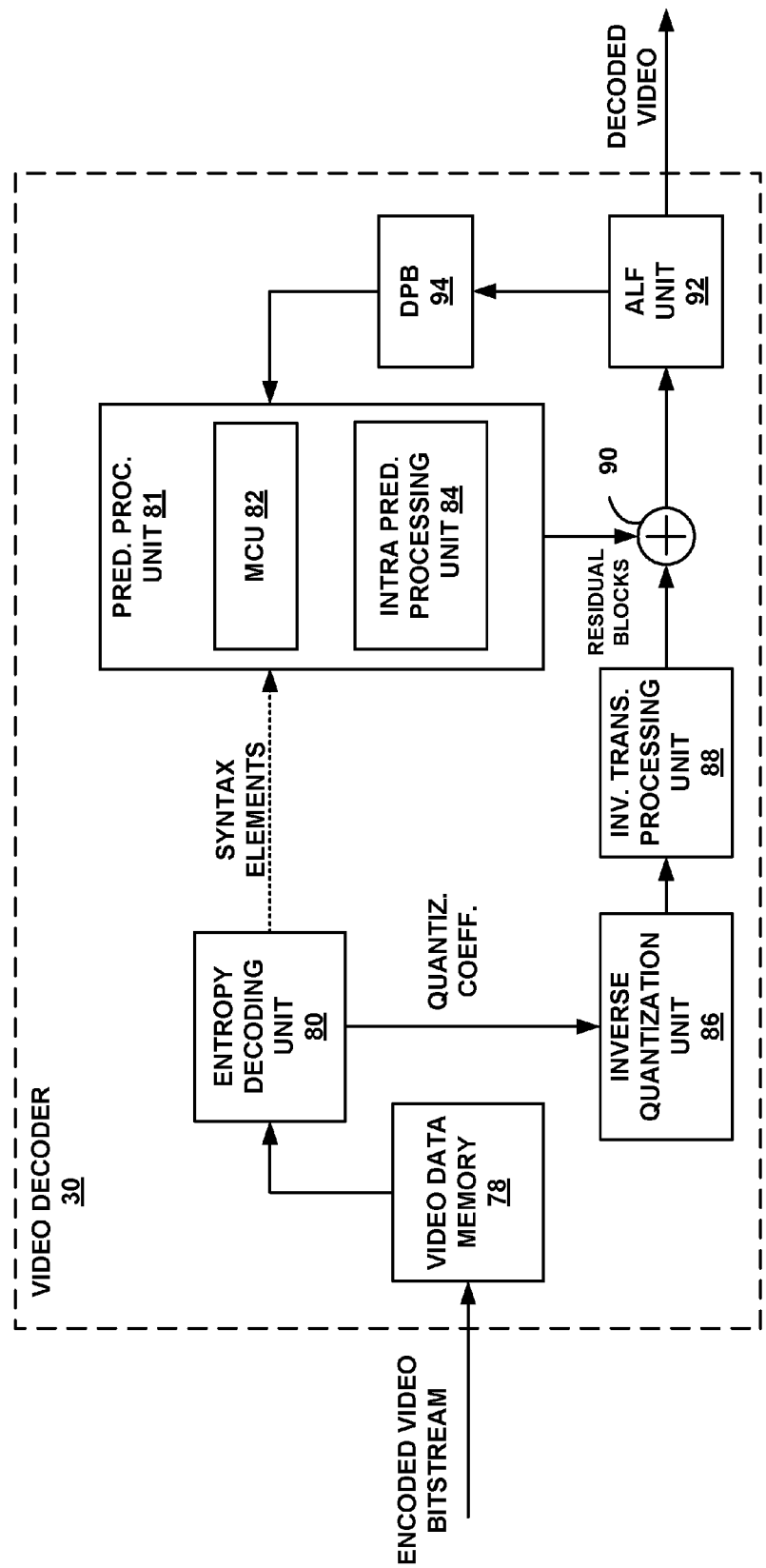
FIG. 5 is a block diagram illustrating an example video decoder that may implement the techniques described in this disclosure.

FIG. 5 is a block diagram illustrating an example video decoder 30 that may implement the techniques described in this disclosure. In the example of FIG. 5, video decoder 30 includes video data memory 78, entropy decoding unit 80, prediction processing unit 81, inverse quantization unit 86, inverse transform processing unit 88, summer 90, and DPB 94. Prediction processing unit 81 includes motion compensation unit 82 and intra prediction unit 84. Video decoder 30 may, in some examples, perform a decoding pass generally reciprocal to the encoding pass described with respect to video encoder 20 from FIG. 4.

During the decoding process, video decoder 30 receives an encoded video bitstream that represents video blocks of an encoded video slice and associated syntax elements from video encoder 20. Video decoder 20 stores the received encoded video bitstream in video data memory 78. Video data memory 78 may store video data, such as an encoded video bitstream, to be decoded by the components of video decoder 30. The video data stored in video data memory 78 may be obtained, for example, via link 16, from storage device 26, or from a local video source, such as a camera, or by accessing physical data storage media. Video data memory 78 may form a coded picture buffer (CPB) that stores encoded video data from an encoded video bitstream. DPB 94 may be a reference picture memory that stores reference video data for use in decoding video data by video decoder 30, e.g., in intra- or inter-coding modes. Video data memory 78 and DPB 94 may be formed by any of a variety of memory devices, such as DRAM, SDRAM, MRAM, RRAM, or other types of memory devices. Video data memory 78 and DPB 94 may be provided by the same memory device or separate memory devices. In various examples, video data memory 78 may be on-chip with other components of video decoder 30, or off-chip relative to those components.

Entropy decoding unit 80 of video decoder 30 entropy decodes the video data stored in video data memory 78 to generate quantized coefficients, motion vectors, and other syntax elements. Entropy decoding unit 80 forwards the motion vectors and other syntax elements to prediction processing unit 81. Video decoder 30 may receive the syntax elements at the video slice level and/or the video block level.

When the video slice is coded as an intra-coded (I) slice, intra prediction unit 84 of prediction processing unit 81 may generate prediction data for a video block of the current video slice based on a signaled intra prediction mode and data from previously decoded blocks of the current frame or picture. When the video frame is coded as an inter-coded slice (e.g., B slice or P slice), motion compensation unit 82 of prediction processing unit 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, List 0 and List 1, using default construction techniques based on reference pictures stored in DPB 94.

Motion compensation unit 82 determines prediction information for a video block of the current video slice by parsing the motion vectors and other syntax elements, and uses the prediction information to produce the predictive blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes, i.e., de-quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform processing unit 88 applies an inverse transform, e.g., an inverse DCT, an inverse integer transform, or a conceptually similar inverse transform process, to the transform coefficients in order to produce residual blocks in the pixel domain.

After prediction processing unit generates the predictive block for the current video block using, for example, intra or inter prediction, video decoder 30 forms a reconstructed video block by summing the residual blocks from inverse transform processing unit 88 with the corresponding predictive blocks generated by motion compensation unit 82. Summer 90 represents the component or components that perform this summation operation. ALF unit 92 filters the reconstructed video block using, for example, one or more of the ALF techniques described in this disclosure.

Although not explicitly shown in FIG. 5, video decoder 30 may also include one or more of a deblocking filter, an SAO filter, or other types of filters. Other loop filters (either in the coding loop or after the coding loop) may also be used to smooth pixel transitions or otherwise improve the video quality. The decoded video blocks in a given frame or picture are then stored in DPB 94, which stores reference pictures used for subsequent motion compensation. DPB 94 may be part of or separate from additional memory that stores decoded video for later presentation on a display device, such as display device 32 of FIG. 1.

ALF unit 92 in conjunction with other components of video decoder 30 may be configured to perform the various techniques described in this disclosure. For example, decoder 30 may be configured to obtain ALF information for a current CTU from one or more of: (i) one or more spatial neighbor CTUs of the current CTU or (ii) one or more temporal neighbor CTUs of the current CTU. Video decoder 30 may form a candidate list based at least partially on the obtained ALF information for the current CTU and perform a filtering operation on the current CTU using ALF information associated with a candidate from the candidate list. The ALF information may include ALF coefficients as well as a mapping of ALF filters to classification metrics.

The decoder 30 in various examples may receive a syntax element comprising an index associated with the candidate from the candidate list and perform the filtering operation on the current CTU using the ALF information associated with the candidate from the candidate list.

In various examples video decoder 30 receives a syntax element comprising an index associated with the candidate from the candidate list, receives difference information, adds the difference information to the ALF information associated with the candidate to determine new ALF information, and performs the filtering operation on the current CTU using the new ALF information. The ALF filter information may, for example, include a plurality of ALF filters, and video decoder 30 may select an ALF filter from the plurality of ALF filters based on one or more classification metrics and perform a filtering operation on one or more pixels of the CTU using the selected ALF filter.

In some example, the one or more classification metrics may include an activity metric and a direction metric. In other examples, the one or more classification metrics ma include one or more of a size of a CU comprising the one or more pixels, a coding mode of the CU comprising the pixels, a size of a transform unit corresponding to the one or more pixels, or a type of transform unit corresponding to the one or more pixels.

In various examples video decoder 30 may generate a filtered image by performing the filtering operation on the one or more pixels of the CTU using the selected ALF filter and output (e.g. display or transmit to a display) the filtered image. In various examples, the one or more spatial neighbor CTUs may be positioned adjacent to the current CTU within a picture. In various examples, the one or more temporal neighbor CTUs may represent co-located CTUs in respective reference pictures. The one or more spatial neighbor CTUs may include a left neighbor CTU and an above neighbor CTU with respect to the current CTU. The one or more temporal neighbor CTUs may include a total of three (3) temporal neighbor CTUs in three (3) respective reference pictures. In some examples, the one or more temporal neighbor CTUs may be co-located CTUs in one or more reference pictures. Additionally or alternatively, the one or more temporal CTUs may be restricted to be in one or more reference pictures with a same slice type.

In various examples, the one or more temporal CTUs may be restricted to be in one or more reference pictures having a same quantization parameter (QP) range. In various examples, video decoder 30 may form the candidate list by inserting the temporal neighbor CTUs into the candidate list based on an order of the reference indexes the temporal neighboring CTUs are associated with. In various examples, video decoder 30 may form the candidate list by forming the candidate list to include one or more temporal neighboring CTUs in the respective reference pictures other than co-located temperal neghboring CTUs.

In various examples, video decoder 30 may obtain the ALF information for the current CTU, which is a 2N×2N CTU, divide the CTU into M×M sub-blocks, where 2N is an integer multiple of M, determine for each M×M sub-block one or more temporal candidates which are located by a motion vector of the M×M sub-block, and derive the ALF informaton from the the one or more temporal candidates located by the motion vector. In various examples, video decoder 30 may locate a temporal candidate with the motion vector. The CTU which covers the top-left corner of the block pointed to by the motion vector may be used as a temporal candidate, or the CTU which covers the center point of the block pointed to by the motion vector is used as a temproal candidate.

In various examples, a maximum number of entries in the candidate list may be a variable value, and the maximum number of entries may be derived from information included in an encoded video bitstream. In various examples, only two candiates from spatial/temporal neighors are incuded in the candidate list. In various examples, the temporal candidates are allowed only if at least one of the blocks in the current CTU is coded with inter prediction mode, or tempral candidates are not allowed for a CTU of an Intra coded slice, or tempral candidates are allowed for a CTU of an Intra coded slice.

In various examples, the temporal candidates may be allowed only if temporal motion vector prediciton is enabled. In various examples, the tempral candidate(s) is/are only allowed from a fixed or dedicated refernce picture, which is signaled in a slice header, and the reference picture may be further contrained to be the reference picture used for temporal motion vector prediction.

In various examples, video decoder 30 may receive signaling information indicating whether temporal candidates are allowed or not. Such signaling may be included as high-level syntax e.g., PPS, slice header, SPS or at other places containing high-level syntax. Video decoder 30 may form the candidate list by applying a pruning process to get rid of one or more duplicate candidates.

In various examples, when spatial or temporal candidates are allowed, video decoder 30 may add those candidates into the candidate list (with or without pruning) in a pre-defined order. Additionally or alternatively, such an order may depend on whether some blocks in the current CTU are temporally predicted. If temporal motion prediction applies to some blocks, video decoder 30 may put the temporal candidates into earlier positions of the list, and ALF may be applied after decoding of the whole CTU. Video decoder 30 may, for example, use the percentage of the area with temporal motion prediction to decide the relative order and position of the temporal candidates in the candidate list. For example, if a reference block is not CTU aligned, video decoder 30 may determine an order for the temporal candidate based on how well, as determined by a percentage of overlap, the reference block and the CTU align.

In some examples, when temporal candidates are allowed, only one temporal candidate may be chosen from reference pictures based on the reference indices of the coded blocks within the CTU. For example, the most frequently used picture may be chosen, or if only a co-lcoated temporal CTU is allowed, motion vectors pointing to pixels outside a region co-located to that of the current CTU may not be taken into consideration for the frequency calculation.

In various examples video decoder 30 may form the candidate list by forming the candidate list to include the obtained ALF information for the current CTU and one or more sample adaptive offset (SAO) parameters associated with the current CTU. The one or more sample adaptive offset SAO parameters and the ALF parameters may be signaled independently but use the same merge mechanism. In various examples, video decoder 30 may decode the current CTU by decoding filter symmetry information associated with the obtained ALF information for the current CTU.

In various examples, video decoder 30 may receive signaling indicating filter symmetry information at the CTU level. The filter symmetry information may include symmetric and non-symmetric information, and the filter symetry informaton may be signaled for each set of filters. Video decoder 30 may receive a flag in a SPS/PPS/slice header to indicate whether a non-symmetric filter will be used in the related parts of the bitstream. In various examples, video decoder 30 may decode the current CTU by decoding quantization information associated with the obtained ALF information for the current CTU.

The quantization information may include a number of bits to be left shifted to generate the interger value of filter coefficient from theparsed filter coefficients. In some examples, instead of explicitly signalling filter coefficients quantization information in the bitstream, video decoder 30 may implicitly derive the filter coefficient quantization information based on the ALF coefficients.

The number of quantization bits may be calculated based on the summation of all ALF weighting coefficients, wherein the sum of non-DC ALF coefficients is first rounded to $2^n$, e.g. sum 126 is rounded to 128 ($2^7$, here n=7). Then the number of quanitzation bits may be derived as the difference between 8 and n. In the previous exmaple, n=7, and therefore the number of quantization bits is 1.

In various examples video decoder 30 may decode data that indicates whether the obtained ALF information for the current CTU is quantized. In various examples, if the obtained ALF information for the current CTU includes only DC coefficients, then video decoder 30 may decode the CTU by decoding only offset values with respect to the obtained ALF information for the current CTU.

In various examples, in the case where only the DC coefficient is present and other coefficients are not present for a filter, video decdoer 30 may receive signaling of the DC coeffcient in the unit of pixels, and in other cases, may receive signaling of DC and other filter coefficients in higher accuracy, e.g., $\tfrac{1}{256}$ of unit pixel value (in this case "one" is normalized to value 256). In various examples video decoder 30, may decode the CTU by decoding a center filter coefficient of the obtained ALF information for the current CTU differently from one or more non-center filter coefficients of the obtained ALF information for the current CTU.

In various examples, the other coefficients may be explicilty signalled while the center coeficient is differential coded, meaning only the difference between the center coefficient value and a default value is coded, wherein the default value is chosen so that it is normalized to be 1. In various examples video decoder 30 may decode the CTU by decoding the CTU based on a two-dimensional group merging operation.

In various examples, after merging, only one set of ALF prameters may be signalled for each merged group. If BA classification applies, the pixels in a CTU may be categorized into several groups,with the group indexes ordered in a 2D map. For 2D group merging, a group may be merged to its left or top neighbors in the 2D map. In various examples video decoder 30 may decode the CTU by decoding the CTU based on a one-dimensional group merging operation that is based on one or more two-dimensional characteristics.

In various examples, the initial filter/group index may be designed following the princple that two adjacent filters (i.e., two filters with adjacent indices) must have either adjacent activities or adjacent directions, and where a filter is only merged to its adjacent neighbor. The one or more two-dimensional characteristics may include an activity characteristic and a direction characteristic.

In various examples, video decoder 30 may determine whether the current CTU exceeds a threshold size, and if the CTU exceeds the threshold size, split the current CTU into two or more smaller CTUs. In various examples, a splitting_flag of a node corrponding to a size larger than the second size (e.g., 64×64) may be set to a value of 1, and in case the node correponds to a size larger than the second size, the flag is signalled to be 1 or the signaling of such a flag can be avoided and it is derived to be 1 in this case.

For example, video decoder 30 may be configured to perform a method of video coding that includes obtaining ALF information for a current CTU, classifying one or more pixels within the CTU based on reconstructed pixel values and based on one or more classification metrics; and based on the classifying of the one or more pixel within the CTU, selecting an ALF filter for the one or more pixels. In various examples, the one or more classification metrics may include a pixel gradient calculated along a plurality of directions, video decoder 30 also is operable to signal a number of directions for the plurality of directions.

The one or more classification metrics may include one or more of: a coding mode of a CU comprising the one or more pixels, a size of the CU comprising the one or more pixels, a transform type for the one or more pixels or a transform size for the one or more pixels.

In various examples video decoder 30 may classify one or more pixels within the CTU based on reconstructed pixel values and based on one or more classification metrics by applying filter coefficients to pixels surrounding the one or more pixels within the CUT. Video decoder 30 may, in response to the pixels surrounding the one or more pixels being unavailable, perform a padding operation to determine interpolated values for the pixels surrounding the one or more pixels.

In various examples, the one or more classification metrics may include a pixel gradient calculated along a plurality of directions. Video decoder 30 may receive signaling indicating a number of directions for the plurality of directions. In various examples, the one or more classification metrics may include one or more of a coding mode of a CU comprising the one or more pixels, a size of the CU comprising the one or more pixels, a transform type for the one or more pixels, or a transform size for the one or more pixels. In various examples, video decoder 30 may classify one or more pixels within the CTU based on reconstructed pixel values and based on one or more classification metrics by applying filter coefficients to pixels surrounding the one or more pixels within the CTU. In response to the pixels surrounding the one or more pixels being unavailable, video decoder 30 may perform a padding operation to determine interpolated values for the pixels surrounding the one or more pixels.

Figure 6:
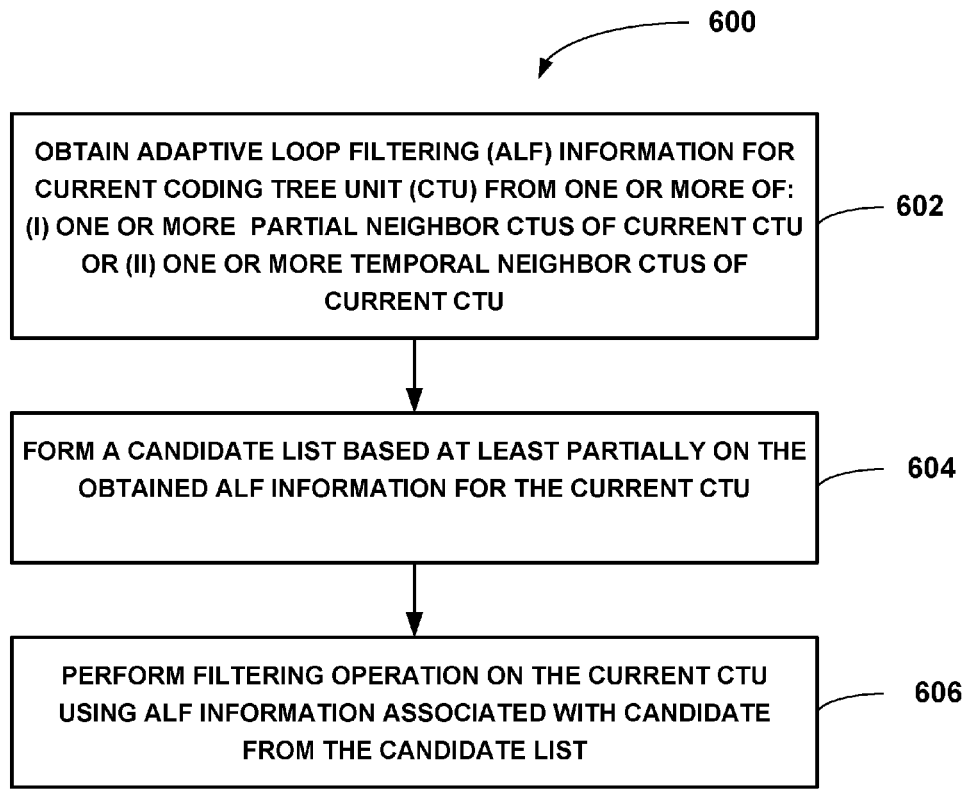
FIG. 6 is a flow diagram illustrating one or more methods that may implement the techniques described in this disclosure.

FIG. 6 is a flow diagram (600) illustrating one or more methods that may implement the techniques described in this disclosure. The methods described in FIG. 6 can be performed by the filter unit of a video encoder or a video decoder, such as ALF unit 64 of video encoder 20, or ALF unit 92 of video decoder 30. The filter unit obtains ALF information for a CTU from one or more of: (i) one or more spatial neighbor CTUs of the current CTU or (ii) one or more temporal neighbor CTUs of the current CTU (602). The filter unit further forms a candidate list based at least partially on the obtained ALF information for the current CTU (604). The filter unit performs a filtering operation on the current CTU using ALF information associated with a candidate from the candidate list (606).

Figure 7:
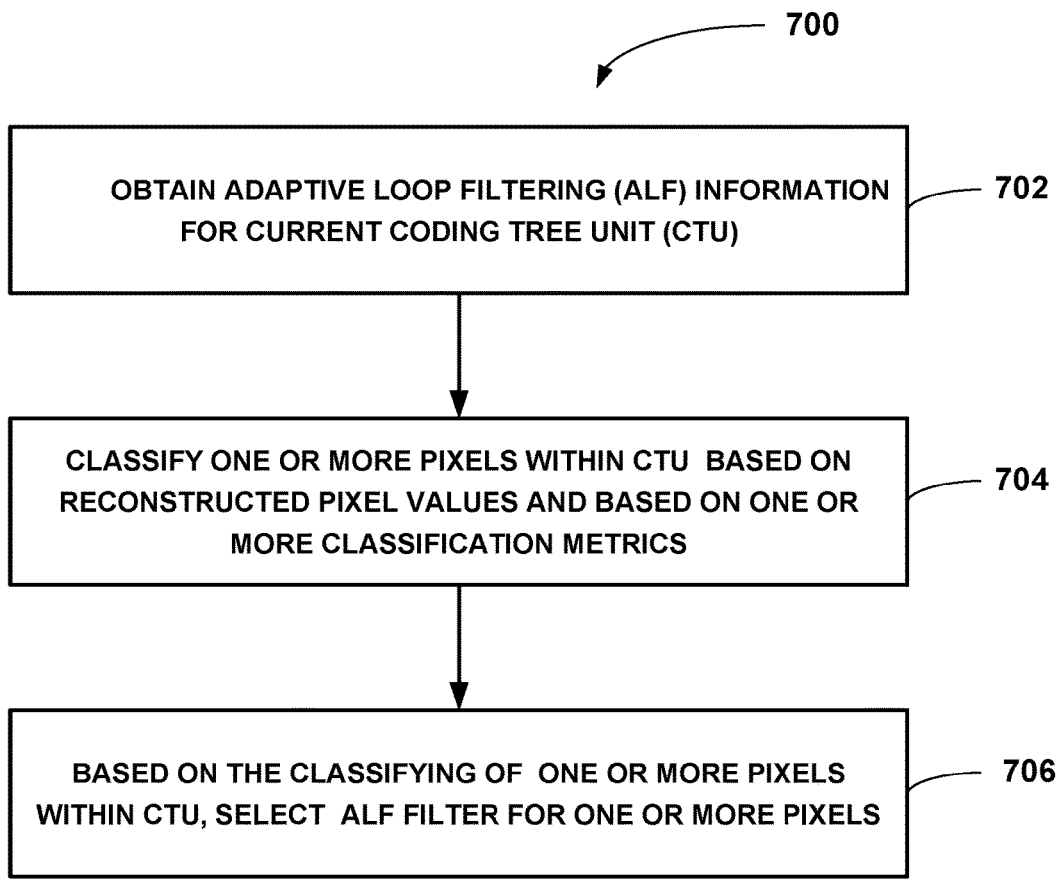
FIG. 7 is a flow diagram illustrating one or more methods that may implement the techniques described in this disclosure.

FIG. 7 is a flow diagram (700) illustrating one or more methods that may implement the techniques described in this disclosure. The methods described in FIG. 6 can be performed by the filter unit of a video encoder or a video decoder, such as ALF unit 64 of video encoder 20, or ALF unit 92 of video decoder 30.

In various examples, the filter unit obtains ALF information for a current CTU (702). The filter unit classifies one or more pixels within the CTU based on reconstructed pixel values and based on one or more classification metrics (704). Based on the classifying of the one or more pixel within the CTU, the filter unit in various examples selects an ALF filter for the one or more pixels (706).

The one or more classification metrics may, for example, include a pixel gradient calculated along a plurality of directions, a coding mode of a CU comprising the one or more pixels, a size of the CU comprising the one or more pixels, a transform type for the one or more pixels, or a transform size for the one or more pixels.

In various examples, the filter unit may perform operations for classifying one or more pixels within the CTU based on reconstructed pixel values and based on one or more classification metrics, apply filter coefficients to pixels surrounding the one or more pixels within the CUT. In response to the pixels surrounding the one or more pixels being unavailable, the filter unit may perform a padding operation to determine interpolated values for the pixels surrounding the one or more pixels.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or

What is claimed is:

1. A method for coding video data, the method comprising:
obtaining adaptive loop filtering (ALF) information for a current coding tree unit (CTU) from one or more of: (i) one or more spatial neighbor CTUs of the current CTU or (ii) one or more temporal neighbor CTUs of the current CTU;
forming a candidate list for the current CTU, the candidate list including a plurality of candidate entries, each of the candidate entries including ALF information determined based at least partially on the obtained ALF information the ALF information including a plurality of ALF filters, each of the ALF filters comprising ALF coefficients;
selecting, from the candidate list, a candidate entry for filtering the current CTU;
for a sample of the CTU, determining values for one or more classification metrics;
based on a mapping of the values for the one or more classification metrics to filters of the plurality for filters, selecting a filter; and
performing a filtering operation on a pixel of the current CTU using the selected filter.

2. The method of claim 1, wherein the method of coding video data comprises a method of decoding the video data, the method further comprising:
receiving a syntax element comprising an index associated with the candidate entry from the candidate list.

3. The method of claim 1, wherein the method of coding video data comprises a method of encoding the video data, the method further comprising:
generating for inclusion in an encoded bitstream of video data a syntax element comprising an index associated with the candidate entry from the candidate list.

4. The method of claim 1, wherein the method of coding video data comprises a method of decoding the video data, the method further comprising:
receiving a syntax element comprising an index associated with the candidate entry from the candidate list;
receiving difference information;
adding the difference information to the ALF information associated with the candidate entry to determine new ALF information;
performing the filtering operation on the current CTU using the new ALF information.

5. The method of claim 1, wherein the method of coding video data comprises a method of encoding the video data, the method further comprising:
determining new ALF information;
generating for inclusion in an encoded bitstream of video data a syntax element comprising an index associated with the candidate entry from the candidate list; and
generating for inclusion in the encoded bitstream of video data difference information identifying a difference between the new ALF information and the ALF information associated with the candidate entry.

6. The method of claim 1, wherein the ALF filter information comprises a plurality of ALF filters, the method further comprising:
selecting an ALF filter from the plurality of ALF filters based on one or more classification metrics; and
performing a filtering operation on one or more pixels of the CTU using the selected ALF filter.

7. The method of claim 6, wherein the one or more classification metrics comprises an activity metric and a direction metric.

8. The method of claim 6, wherein the one or more classification metrics comprise one or more of a size of a CU comprising the one or more pixels, a coding mode of the CU comprising the pixels, a size of a transform unit corresponding to the one or more pixels, or a type of transform unit corresponding to the one or more pixels.

9. The method of claim 6, further comprising:
generating a filtered image by performing the filtering operation on the one or more pixels of the CTU using the selected ALF filter; and
outputting the filtered image.

10. The method of claim 4, wherein the method for coding is performed as part of a decoding loop of an encoding operation, and wherein the method further comprises:
generating a filtered image by performing the filtering operation on the one or more pixels of the CTU using the selected ALF filter; and
storing the filtered image in a decoded picture buffer.

11. The method of claim 1, the method being performed by a wireless communication device, wherein the wireless communication device comprises:
a receiver configured to receive encoded video data;
a processor configured to execute instructions to process the encoded video data.

12. The method of claim 11, wherein the wireless communication device comprises a cellular telephone and the encoded video data is received by the receiver and demodulated according to a cellular communication standard.

13. The method of claim 1, the method being performed by a wireless communication device, wherein the wireless communication device comprises:
a transmitter configured to transmit encoded video data;
a processor configured to execute instructions to process the encoded video data.

14. The method of claim 13, wherein the wireless communication device comprises a cellular telephone and wherein the encoded video data is modulated according to a cellular communication standard and transmitted by the transmitter.

15. A device for coding video data, the device comprising:
a memory configured to store video data; and
one or more processors configured to:
obtain adaptive loop filtering (ALF) information for a current coding tree unit (CTU) from one or more of: (i) one or more spatial neighbor CTUs of the current CTU or (ii) one or more temporal neighbor CTUs of the current CTU;
form a candidate list for the current CTU, the candidate list including a plurality of candidate entries, each of the candidate entries including ALF information determined based at least partially on the obtained ALF information, the ALF information including a plurality of ALF filters, each of the ALF filters comprising ALF coefficients;
select, from the candidate list, a candidate entry for filtering the current CTU;
for a sample of the CTU, determine values for one or more classification metrics;
based on a mapping of the values for the one or more classification metrics to filters of the plurality for filters, select a filter; and perform a filtering operation on a pixel of the current CTU using list the selected filter.

16. The device of claim 15, wherein the one or more processors are configured to decode the video data, wherein to decode the video data the one or more processors are further configured to:
receive a syntax element comprising an index associated with the candidate entry from the candidate list.

17. The device of claim 15, wherein the one or more processors are configured to encode the video data, wherein to encode the video data the one or more processors are further configured to generate for inclusion in an encoded bitstream of video data a syntax element comprising an index associated with the candidate entry from the candidate list.

18. The device of claim 15, wherein the one or more processors are configured to decode the video data, wherein to decode the video data the one or more processors are further configured to:
receive a syntax element comprising an index associated with the candidate entry from the candidate list;
receive difference information;
add the difference information to the ALF information associated with the candidate entry to determine new ALF information; and
perform the filtering operation on the current CTU using the new ALF information.

19. The device of claim 15, wherein the one or more processors are configured to encode video data, wherein to encode data the one or more processors are further configured to:
determine new ALF information;
generate for inclusion in an encoded bitstream of video data a syntax element comprising an index associated with the candidate entry from the candidate list; and
generate for inclusion in the encoded bitstream of video data difference information identifying a difference between the new ALF information and the ALF information associated with the candidate entry.

20. The device of claim 15, wherein the ALF filter information comprises a plurality of ALF filters, and the one or more processors are further configured to:
select an ALF filter from the plurality of ALF filters based on one or more classification metrics; and
perform a filtering operation on one or more pixels of the CTU using the selected ALF filter.

21. The device of claim 20, wherein the one or more classification metrics comprise one or more of a size of a CU comprising the one or more pixels, a coding mode of the CU comprising the pixels, a size of a transform unit corresponding to the one or more pixels, or a type of transform unit corresponding to the one or more pixels.

22. The device of claim 20, wherein the one or more processors are further configured to:
generate a filtered image by performing the filtering operation on the one or more pixels of the CTU using the selected ALF filter; and
output the filtered image.

23. The device of claim 18, wherein the one or more processors are configured to perform coding as part of a decoding loop of an encoding operation, and wherein the one or more processors are further configured to:
generate a filtered image by performing the filtering operation on the one or more pixels of the CTU using the selected ALF filter; and
store the filtered image in a decoded picture buffer.

24. The device of claim 15, wherein the device is a wireless communication device, and wherein the wireless communication device comprises:
a receiver configured to receive encoded video data,
wherein the one or more processors are configured to execute instructions to process the received encoded video data.

25. The device of claim 24, wherein the wireless communication device comprises a cellular telephone and the encoded video data is received by the receiver and demodulated according to a cellular communication standard.

26. The device of claim 15, wherein the device is a wireless communication device, the wireless communication device comprises:
a transmitter configured to transmit encoded data; and
wherein the one or more processors are configured to execute instructions to process the video data in preparation for transmission by the transmitter.

27. The device of claim 26, wherein the wireless communication device is a cellular telephone and the encoded video data is modulated according to a cellular communication standard and then transmitted by the transmitter.

28. A device for coding video data, the device comprising:
means for obtaining adaptive loop filtering (ALF) information for a current coding tree unit (CTU) from one or more of: (i) one or more spatial neighbor CTUs of the current CTU or (ii) one or more temporal neighbor CTUs of the current CTU;
means for forming a candidate list for the current CTU, the candidate list including a plurality of candidate entries, each of the candidate entries including ALF information determined based at least partially on the obtained ALF information, the ALF information including a plurality of ALF filters, each of the ALF filters comprising ALF coefficients;
means for selecting, from the candidate list, a candidate entry for filtering the current CTU;
means for determining values for one or more classification metrics for a sample of the CTU;
means for selecting a filter based on a mapping of the values for the one or more classification metrics to filters of the plurality for filters; and
means for performing a filtering operation on a pixel of the current CTU using the selected filter.

29. The device of claim 28, further comprising:
means for decoding the video data, wherein the means for decoding the video data further comprises:
means for receiving a syntax element comprising an index associated with the candidate entry from the candidate list.

30. The device of claim 28, further comprising:
means for encoding the video data, wherein the means for encoding the video data further comprises means for generating for inclusion in an encoded bitstream of video data a syntax element comprising an index associated with the candidate entry from the candidate list.

31. The device of claim 28, further comprising:
means for decoding the video data, wherein the means for decoding video data further comprises:
means for receiving a syntax element comprising an index associated with the candidate entry from the candidate list;
means for receiving difference information;
means for adding the difference information to the ALF information associated with the candidate entry to determine new ALF information; and means performing the filtering operation on the current CTU using the new ALF information.

32. The device of claim 28, further comprising:
means for encoding the video data, the means for encoding the video data further comprises:
means for determining new ALF information;
means for generating for inclusion in an encoded bitstream of video data a syntax element comprising an index associated with the candidate entry from the candidate list; and
means for generating for inclusion in the encoded bitstream of video data difference information identifying a difference between the new ALF information and the ALF information associated with the candidate entry.

33. The device of claim 28, wherein the ALF filter information comprises a plurality of ALF filters, and wherein the means for obtaining the adaptive loop filtering (ALF) information further comprises:
means for selecting an ALF filter from the plurality of ALF filters based on one or more classification metrics; and
means for performing a filtering operation on one or more pixels of the CTU using the selected ALF filter.

34. The device of claim 33, wherein the one or more classification metrics comprise one or more of a size of a CU comprising the one or more pixels, a coding mode of the CU comprising the pixels, a size of a transform unit corresponding to the one or more pixels, or a type of transform unit corresponding to the one or more pixels.

35. The device of claim 33, further comprising:
means for generating a filtered image by performing the filtering operation on the one or more pixels of the CTU using the selected ALF filter; and
means for outputting the filtered image.

36. The device of claim 31, wherein the means for decoding the video data is configured to perform decoding as part of a decoding loop of an encoding operation, and wherein the means for decoding the video data further comprises:
means for generating a filtered image by performing the filtering operation on the one or more pixels of the CTU using the selected ALF filter; and
means for storing the filtered image in a decoded picture buffer.

37. The device of claim 28, further comprising:
means for performing wireless communication, wherein the means for performing wireless communication comprises:
means for receiving encoded video data; and
means for executing instructions to process the encoded video data.

38. The device of claim 28, further comprising:
means for performing wireless communication, wherein the means for performing wireless communication comprises:
means for executing instructions to encode the video data; and
means for transmitting the encoded video data.

39. A non-transitory computer readable storage medium having stored thereon instructions that, when executed by one or more processors, cause the one or more processors to:
obtain adaptive loop filtering (ALF) information for a current coding tree unit (CTU) from one or more of: (i) one or more spatial neighbor CTUs of the current CTU or (ii) one or more temporal neighbor CTUs of the current CTU;
form a candidate list for the current CTU, the candidate list including a plurality of candidate entries, each of the candidate entries including ALF information determined based at least partially on the obtained ALF information, the ALF information including a plurality of ALF filters, each of the ALF filters comprising ALF coefficients; and
select, from the candidate list, a candidate entry for filtering the current CTU;
for a sample of the CTU, determine values for one or more classification metrics;
based on a mapping of the values for the one or more classification metrics to filters of the plurality for filters, select a filter; and
perform a filtering operation on a pixel of the current CTU using the selected filter.

40. The non-transitory computer readable storage medium of claim 39, wherein the instructions cause the one or more processors to perform decoding of the video data, and storing further instructions that when executed cause the one or more processors to:
receive a syntax element comprising an index associated with the candidate entry from the candidate list.

41. The non-transitory computer readable storage medium of claim 39, wherein the instructions cause the one or more processors to perform encoding of the video data, storing further instructions, that when executed by the one or more processors, cause the one or more processors to generate, for inclusion in an encoded bitstream of video data, a syntax element comprising an index associated with the candidate entry from the candidate list.

42. The non-transitory computer readable storage medium of claim 39, wherein the instructions cause the one or more processors to perform decoding of the video data, and storing further instructions that when executed cause the one or more processors to:
receive a syntax element comprising an index associated with the candidate entry from the candidate list;
receive difference information;
add the difference information to the ALF information associated with the candidate entry to determine new ALF information; and
perform the filtering operation on the current CTU using the new ALF information.

43. The non-transitory computer readable storage medium of claim 39, wherein the instructions cause the one more processors to perform encoding of the video data, and storing further instructions that when executed cause the one or more processors to:
determine new ALF information;
generate for inclusion in an encoded bitstream of video data a syntax element comprising an index associated with the candidate entry from the candidate list; and
generate for inclusion in the encoded bitstream of video data difference information identifying a difference between the new ALF information and the ALF information associated with the candidate entry.

44. The non-transitory computer readable storage medium of claim 39, wherein the ALF filter information comprises a plurality of ALF filters, and storing further instructions that when executed cause the one or more processors to:
select an ALF filter from the plurality of ALF filters based on one or more classification metrics; and
perform a filtering operation on one or more pixels of the CTU using the selected ALF filter.

45. The non-transitory computer readable storage medium of claim 44, wherein the one or more classification metrics comprise one or more of a size of a CU comprising the one or more pixels, a coding mode of the CU comprising the pixels, a size of a transform unit corresponding to the one or more pixels, or a type of transform unit corresponding to the one or more pixels.

46. The non-transitory computer readable storage medium of claim 44, storing further instructions that when executed cause the one or more processors to:
   generate a filtered image by performing the filtering operation on the one or more pixels of the CTU using the selected ALF filter; and
   output the filtered image.

47. The non-transitory computer readable storage medium of claim 42, storing further instructions that when executed, by the one or more processors, cause the one or more processors to perform the filtering operation on the current CTU using ALF information associated with the candidate entry from the candidate list as part of a decoding loop of an encoding operation, and storing further instructions that when executed cause the one or more processors to:
   generate a filtered image by performing the filtering operation on the one or more pixels of the CTU using the selected ALF filter; and
   store the filtered image in a decoded picture buffer.

* * * * *